(12) United States Patent
Uemura et al.

(10) Patent No.: US 6,508,703 B1
(45) Date of Patent: Jan. 21, 2003

(54) AIR PASSAGE OPENING/CLOSING DEVICE FOR VEHICLE AIR CONDITIONER

(75) Inventors: Yukio Uemura, Nagoya (JP); So Hibino, Anjo (JP); Teruhiko Kameoka, Okazaki (JP); Masafumi Kawashima, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/710,608

(22) Filed: Nov. 9, 2000

(30) Foreign Application Priority Data

| Nov. 11, 1999 | (JP) | 11-321632 |
| Jun. 27, 2000 | (JP) | 2000-193147 |
| Sep. 11, 2000 | (JP) | 2000-275306 |

(51) Int. Cl.$^7$ ............................................. B60H 1/00
(52) U.S. Cl. ....................... 454/156; 251/901; 454/121
(58) Field of Search ...................... 251/901; 454/121, 454/126, 156, 159, 160, 161

(56) References Cited

U.S. PATENT DOCUMENTS 4,867,202 A * 9/1989 Farmer ................. 137/625.18
5,238,023 A * 8/1993 Olofsson ............... 137/596.17
5,326,315 A * 7/1994 Inoue et al. ................ 454/126
5,893,407 A * 4/1999 Okamoto et al. ........... 137/872

FOREIGN PATENT DOCUMENTS

| JP | U-3-1812 | 1/1991 |
| JP | A-8-2238 | 1/1996 |
| JP | B2-2526854 | 6/1996 |
| JP | A-11-5430 | 1/1999 |

* cited by examiner

Primary Examiner—Harold Joyce
(74) Attorney, Agent, or Firm—Harness, Dickey & Pierce, PLC

(57) ABSTRACT

In an air passage opening/closing device for a vehicle air conditioner, a driving member is disposed to apply driving force for a reciprocating movement of a film member to at least one position of the film member, and a guide member is provided in an air-conditioning case to guide the reciprocating movement of the film member. The film member has a flexible performance to move in a bend path, and has a rigidity to be moved along the guide member when pushing force from the driving member is applied to the film member. Thus, the air passage opening/closing device using the film member has a simple structure without a film-winding mechanism.

34 Claims, 31 Drawing Sheets

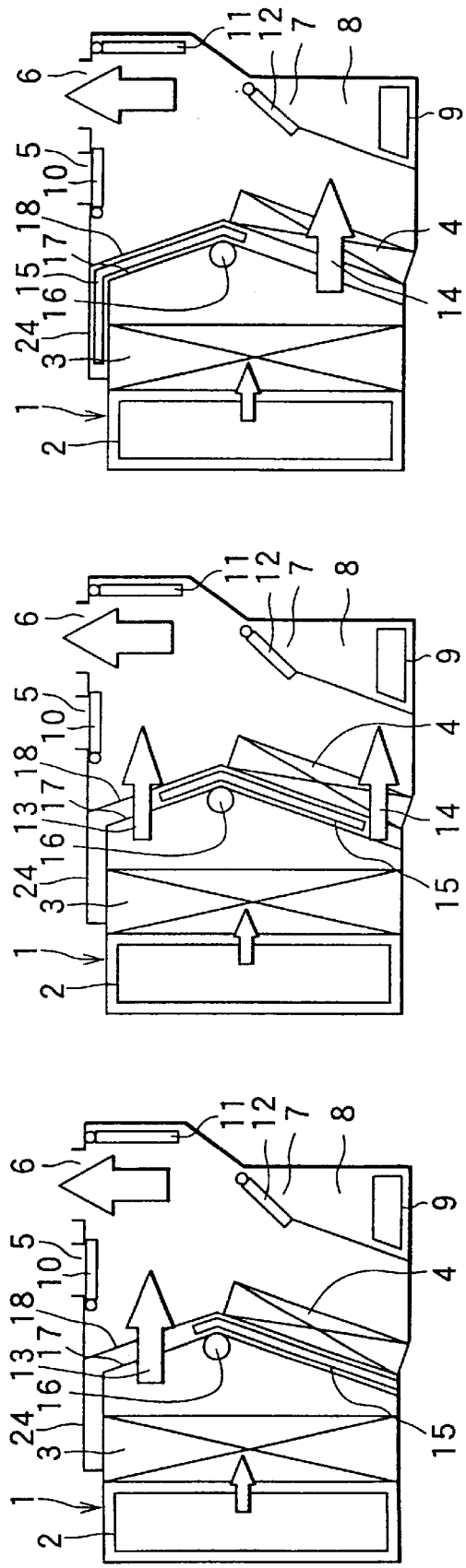

AIR PASSAGE OPENING/CLOSING DEVICE FOR VEHICLE AIR CONDITIONER

CROSS REFERENCE TO RELATED APPLICATIONS

This application is based upon and claims the benefit of Japanese Patent Applications No. 11-321632 filed on Nov. 11, 1999, No. 2000-193147 filed on Jun. 27, 2000, and No. 2000-275306 filed on Sep. 11, 2000, the contents of which are incorporated herein by reference.

BACKGROUND OF THE INVENTION

1. Field of the Invention

This invention relates to an air passage opening/closing device for opening and closing an air passage by moving a film member in the air passage. The device is suitable for use for example in a vehicle air conditioner.

2. Description of the Related Art

An air passage opening/closing device for switching an air passage by movement of a film member is proposed in JP-A-8-2238. In this related art, the ends of a flexible film member such as a resin film are attached to a driving shaft and a following shaft rotatably mounted in an air-conditioning case, a pulley is connected coaxially to an end of each of the shafts, and the ends of a wire are wound on the pulleys. The driving shaft is connected to a motor and is rotationally driven by the motor.

When the driving shaft is rotated in the direction in which it takes up (winds) the film member, the driving shaft directly takes up (winds) the film member and thus moves the film member inside the air-conditioning case. When reversely the driving shaft is rotated in the direction in which it lets out (rewinds) the film member, this rotation of the driving shaft is transmitted via the pulleys and the wire to the following shaft. Therefore, the following shaft rotates in the direction in which it takes up (winds) the film member, and the film member is wound around the following shaft and thus moved inside the air-conditioning case in the opposite direction. By the film member being moved in forward and reverse directions inside the air-conditioning case, an air passage can be opened and closed.

However, in this related art, because the ends of the film member are respectively connected to and are wound by the driving shaft and the following shaft, it is necessary for the driving shaft and the following shaft to be operatively coupled. Consequently, an operatively coupling mechanism such as pulleys and a wire is necessary. Therefore, the number of parts in the device becomes large, its assembly is complicated, and its cost is high.

SUMMARY OF THE INVENTION

It is therefore an object of the invention to provide an air passage opening/closing device for opening and closing an air passage using a flexible film member, which has a simple structure without a winding mechanism of the film member.

According to the present invention, in an air passage opening/closing device, a film member having a predetermined flexible performance is disposed to be reciprocated in an air passage for opening and closing the air passage, a driving member is disposed to apply driving force for a reciprocating movement of the film member to at least one position of the film member, and a guide member is disposed to guide the film member for the reciprocating movement of the film member. The film member has a rigidity equal to or larger than a predetermined degree, so that the film member moves along the guide member when a pushing force pushing the film member is applied to the film member from the driving member. Thus, when the driving force is applied to the film member from the driving member, the film member reciprocates along the guide member. Accordingly, the air passage opening/closing device using the film member has a simple structure without using a winding mechanism of the film member.

Preferably, the driving member includes a driving shaft and a driving gear driven by the driving shaft, the film member is reciprocated by the rotation of the driving gear, and a pressing member is disposed in the air duct to press the film member onto the driving gear. Therefore, the engagement between the driving gear and the film member can be accurately maintained using the pressing member.

Preferably, at least one end of the film member in a reciprocating direction has a supported part supported by the guide member, and a non-supported part except for the supported part. Further, the non-supported part is recessed from the supported part. Thus, the end of the film member in the reciprocating direction can be accurately readily received in a receiving space of an air duct while being smoothly guided by the guide member.

According to the present invention, the film member has at least a fee end in the reciprocating direction of the film member, the air passage has a plurality of openings opened in the air duct toward a direction perpendicular to the reciprocating direction, the openings are partitioned by a partition portion of the air duct between the openings, and the driving member is disposed at a position on an extending line of the partition portion. Thus, an additional space for only the driving member is unnecessary. Accordingly, the size of the air passage opening/closing device can be made smaller, and it is possible to increase the opening area of the openings.

Alternatively, in a case where at least one of the openings is an always opened port by the film member, the driving member can be disposed at a position on an extending line of the always opened port. Even in this case, an additional space for only the driving member is unnecessary.

Preferably, the driving member is a driving sprocket having teeth, the film member has engagement holes engaging with the teeth of the driving sprocket, and the engagement holes are arranged on the extending line. Therefore, the reciprocating operation of the film member can be made simple.

Preferably, the air duct has a peripheral member defining an opening communicating the air passage, the film member has a film stopper member at an end in the reciprocating direction, the peripheral member has an peripheral stopper member protruding to the opening of the air passage, and the peripheral stopper member engages with the film stopper member at a predetermined movement position of the film member. Therefore, the film member is reciprocated accurately in a predetermined movement range.

BRIEF DESCRIPTION OF THE DRAWINGS

Additional objects and advantages of the present invention will be more readily apparent from the following detailed description of preferred embodiments thereof when taken together with the accompanying drawings, in which;

FIGS. 2A, 2B, 2C are schematic sectional views of the vehicle air conditioner, during a maximum cooling, an intermediate temperature control and a maximum heating, respectively, according to the first embodiment;

DETAILED DESCRIPTION OF THE PREFERRED EMBODIMENTS

Preferred embodiments of the present invention will be now described with reference to the drawings.

(First Preferred Embodiment)

Figure 1:
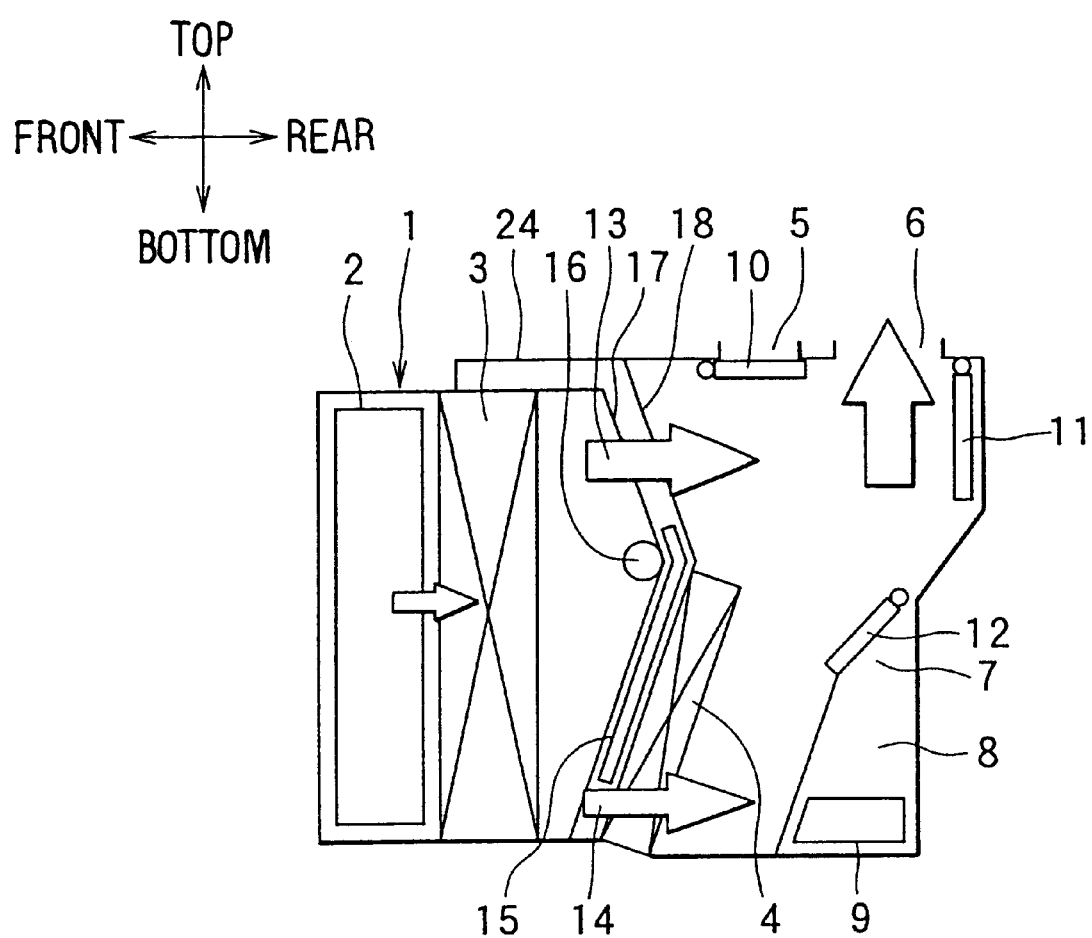
FIG. 1 is a schematic sectional view showing a vehicle air conditioner according to a first preferred embodiment of the present invention.

In the first embodiment, the present invention is typically applied to a vehicle air conditioner. The vehicle air conditioner in the first embodiment has an air-conditioning case (case member) 1 made of resin. The air-conditioning case 1 is mounted approximately centrally in the vehicle left-right direction behind a dashboard in the passenger compartment of a vehicle and disposed as shown in FIG. 1 with respect to the front-rear and vertical directions of the vehicle.

An air inlet 2 is provided in a side face of the air-conditioning case 1 at the vehicle front end thereof. In the case of a right hand drive car, the air inlet 2 is provided in the front-passenger's seat side face (the vehicle left side surface) of the air-conditioning case 1. On the other hand, an air outlet of a blower unit (not shown) mounted behind the dashboard at the front-passenger's seat side is connected to the air inlet 2. When a blower inside the blower unit is operated, air flows through the air inlet 2 into the air-conditioning case 1.

An evaporator 3 and a heater core 4 are disposed inside the air-conditioning case 1 in that order from the air-upstream side. The evaporator 3 is a part of an ordinary refrigerating cycle, and is used as a cooling heat exchanger for cooling air flowing through the air-conditioning case 1.

Refrigerant in the evaporator 3 is evaporated by absorbing heat from air, so that air passing through the evaporator 3 is cooled. The heater core 4 is a heating heat exchanger for heating air inside the air-conditioning case 1 using hot water (engine-cooling water) flowing therethrough as a heat source.

Plural air delivery ports 5 through 7 are formed in a downstream end of the air-conditioning case 1. Among these, a defroster port 5 is connected to a defroster duct (not shown), so that conditioned air is blown through a defroster outlet at a top end of the defroster duct toward an inner side of a front windshield of the vehicle. A face duct (not shown) is connected to a face port 6, so that conditioned air is blown from a face outlet at a top end of the face duct toward the upper body of a passenger in a passenger compartment of the vehicle.

Also, a foot delivery duct 8 provided integrally with the air-conditioning case 1 is connected to a foot port 7, and foot outlets 9 for blowing conditioned air toward the feet area of the passenger in the passenger compartment are provided at the ends of branches of the foot delivery duct 8 on the left and right side of the air-conditioning case 1. In this example, the delivery ports 5, 6 and 7 respectively are opened and closed by plate doors 10, 11 and 12 disposed rotatably.

Within the air-conditioning case 1, a cool air bypass passage 13 through which cool air having passed through the evaporator 3 bypasses the heater core 4 is formed above the heater core 4. Also, an air-mixing film member 15 (i.e., film door) is disposed movably back and forth across the cool air bypass passage 13 and an airflow passage 14 of the heater core 4.

The air-mixing film member 15 is used as a temperature adjusting unit for adjusting temperature of air blown into the passenger compartment by adjusting a flow ratio of cool air passing through the cool air bypass passage 13 and warm air passing through the airflow passage 14 of the heater core 4. To allow the size of the air-conditioning case 1 to be made compact, the air-mixing film member 15 reciprocates along a bent path inside the air-conditioning case 1, as shown in FIG. 2. Accordingly, the air-mixing film member 15 is made of a flexible resin film material in the form of a thin film.

In the first embodiment, the air-mixing film member 15 is reciprocated in a reciprocation direction A (see FIGS. 3B, 3C, roughly the vertical direction in FIGS. 1 and 2A–2C) by a driving force transmitted from a driving shaft 16 disposed in one location only. As a result, the ends of the air-mixing film member 15 in the reciprocation direction A are not connected to a winding mechanism and are free ends. Therefore, the air-mixing film member 15 is moved by a pulling force from the driving shaft 16 acting on the trailing part of the air-mixing film member 15 on the rearward side of the driving shaft 16 in the reciprocation direction A and a pushing force from the driving shaft 16 acting on the leading part of the air-mixing film member 15 on the forward side of the driving shaft 16 in the reciprocation direction A. To facilitate the movement of the air-mixing film member 15, guide members 17, 18 are provided on a side of the air-conditioning case 1, and both ends of the air-mixing film member 15 in a width direction (i.e., the left-right direction in FIGS. 3A and 3C) perpendicular to the reciprocation direction A are guided by the guide members 17 and 18.

For the air-mixing film member 15 to be moved (advanced) by a pushing force along the guide members 17 and 18, it is necessary- for the air-mixing film member 15 to have a predetermined rigidity. Accordingly, the material and the sheet thickness of the air-mixing film member 15 are selected so that the necessary rigidity is obtained. As a specific material for the air-mixing film member 15, a resin material such as PET (Polyethylene Terephthalate) which is flexible and has a low frictional resistance, is suitably used, or alternatively an elastomer film or the like having a suitable rigidity may be used.

Next, a driving mechanism of the air-mixing film member 15 will be described in detail. As shown in FIGS. 1 and 2A through 2C, the driving shaft 16 is disposed in the vicinity of the upper end of the heater core 4, and is positioned where the air-mixing film member 15 bends. Also, more specifically, the driving shaft 16 is disposed so as to extend in the width direction of the film member at an air upstream side (the upstream side in the airflow) of the air-mixing film member 15, as shown in FIG. 3A.

One end of the driving shaft 16 is connected outside the air-conditioning case 1 to a drive motor (for example a stepping motor) (not shown), and the driving shaft 16 is rotationally driven in forward and reverse directions by the drive motor.

The driving shaft 16 is integrally provided near its ends with two drive sprockets 19 and 20 (driving member). Sprocket holes 15a and 15b for the teeth of the drive sprockets 19, 20 to mesh with are provided along the sides (the width direction ends) of the air-mixing film member 15, as shown in FIGS. 3A and 3C. These sprocket holes 15a, 15b are formed continuously with a predetermined spacing along substantially the entire length of the air-mixing film member 15 in the reciprocation direction A. The drive sprockets 19 and 20 rotate and their teeth engages with the sprocket holes 15a and 15b of the air-mixing film member 15, so that a driving force in the reciprocation direction A can be applied to the air-mixing film member 15.

Figure 3A:
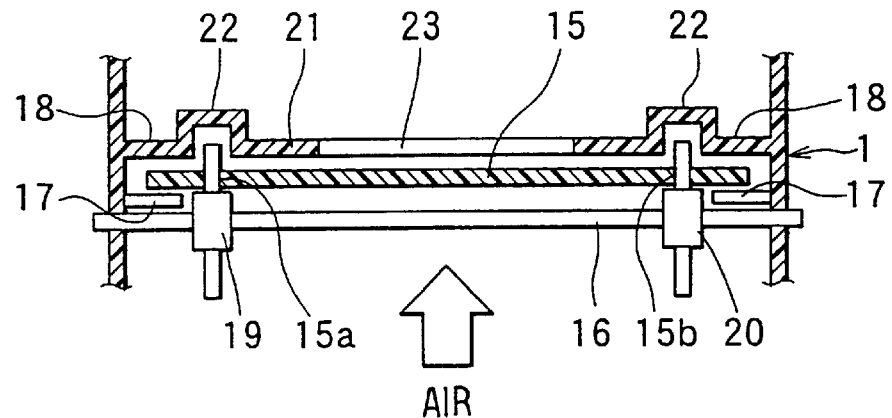
FIG. 3A is a sectional view showing an air passage opening/closing device of the vehicle air conditioner according to the first embodiment.
Figure 3B:
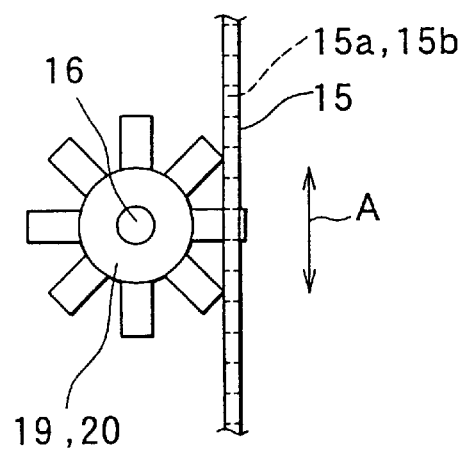
FIG. 3B is a side view showing a driving member and a film member in FIG. 3A.
Figure 3C:
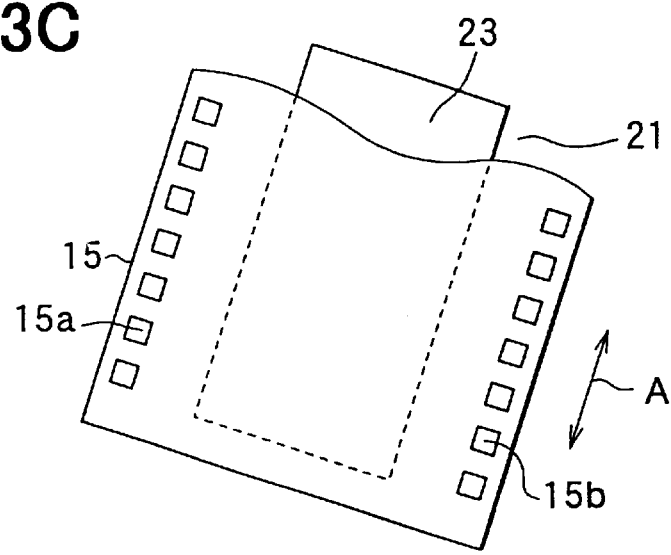
FIG. 3C is a top view of the film member in FIG. 3A.

Because the sprocket holes 15a and 15b in the air-mixing film member 15 are positioned facing outer areas of a sealing wall 21 of the air-conditioning case 1, as shown in FIGS. 3A and 3C, there is no leakage of air through the sprocket holes 15a, 15b. Concavities 22 for avoiding interference between the sealing wall 21 and the drive sprockets 19 and 20 are formed in the sealing wall 21 at the locations of the drive sprockets 19 and 20. An opening 23 provided in the sealing wall 21 forms the above-mentioned air bypass passage 13 or the airflow passage 14 of the heater core 4. The air-mixing film member 15 is pressed by airflow pressure against the sealing wall 21 formed around the edge of the opening 23, the air-mixing film member 15 closes the opening 23 (and hence the passages 13 and 14).

The guide members 17, 18 can be formed integrally with the air-conditioning case 1. The guide members 18, on the downstream side of the air-mixing film member 15, can be made integral with the outer areas of the sealing wall 21, as shown in FIG. 3A. The guide members 17, on the upstream side of the air-mixing film member 15, can be smaller than the sealing wall 21 in the dimension by which they project from the inner walls of the air-conditioning case 1, as shown in FIG. 3A. To avoid interference between the guide members 17 and the drive sprockets 19 and 20, the guide members 17 are locally cut away at the locations of the drive sprockets 19 and 20.

In the first embodiment, a sectional area of the cool air bypass passage 13 is made smaller than a sectional area of the airflow passage 14 of the heater core 4. Therefore, a receiving space 24 for receiving an upper end of the air-mixing film member 15 is formed by the ends of the guide members 17 and 18 on a side of the cool air bypass passage 13, at the top of the air-conditioning case 1.

Next, the operation of the vehicle air conditioner according to the first embodiment having the construction described above will be described. FIG. 2A shows a maximum cooling state of the air-mixing film member 15. During the maximum cooling, the air-mixing film member 15 is positioned at a lowest position in the vertical direction of the vehicle to completely close the airflow passage 14 of the heater core 4 and completely open the cool air bypass passage 13. Therefore, all the cool air from the evaporator 3 passes through the cool air bypass passage 13, and the maximum cooling is set.

When the driving shaft 16 and the drive sprockets 19 and 20 of the driving member are rotated by the drive motor (not shown) in the counterclockwise direction from the maximum cooling state of FIG. 2A, the air-mixing film member 15 is moved upward by the rotation of the drive sprockets 19, 20 to open the airflow passage 14 of the heater core 4 by a certain opening degree, as shown in FIG. 2B, and to reduce an opening degree of the cool air bypass passage 13 by a certain degree. Accordingly, cool air from the cool air bypass passage 13 and warm air having passed through the heater core 4 can be mixed at a certain ratio to obtain a desired air temperature (conditioned air).

When the driving shaft 16 and the drive sprockets 19 and 20 are rotated further in the counterclockwise direction from the intermediate temperature control state of FIG. 2B, the air-mixing film member 15 moves further upward and fully opens the airflow passage 14 of the heater core 4 and fully closes the cool air bypass passage 13, as shown in FIG. 2C. In this case, because all of the cool air from the evaporator 3 flows into the heater core 4 and is heated in the heater core 4, maximum heating is set.

Because the air-mixing film member 15 can fully close the airflow passage 14 which has a larger area than the cool air bypass passage 13, the area of the air-mixing film member 15 is larger than that of the cool air bypass passage 13. Therefore, in the maximum heating, there is an unnecessary portion of the air-mixing film member 15 at its upper end, which is unnecessary for air passage switching. However, because this unnecessary portion is received in the receiving space 24 formed at the top of the air-conditioning case 1, it does not cause any problems.

If the driving shaft 16 and the drive sprockets 19 and 20 are rotated in the clockwise direction from the maximum heating state shown in FIG. 2C, the air-mixing film member 15 moves downward, and the intermediate temperature control state of FIG. 2B and then the maximum cooling state of FIG. 2A are successively obtained.

In the first embodiment, both the ends of the air-mixing film member 15 in the reciprocation direction A are made free ends, and a driving force is applied to the air-mixing film member 15 from a single location in the reciprocation direction A. Therefore, a mechanism for winding the air-mixing film member 15 is not needed. Consequently, the driving mechanism of the film member can be greatly simplified.

Furthermore, because the guide members 17 and 18 for guiding the side ends (the width direction ends) of the air-mixing film member 15 are provided in the air-conditioning case 1 and the air-mixing film member 15 is constructed to have a degree of rigidity such that it can be moved along the guide members 17 and 18 by a pushing force from the drive sprockets 19 and 20, the air-mixing film member 15 can be moved along a bent path without a winding mechanism.

That is, according to the first embodiment, by taking advantage of the flexibility of the air-mixing film member 15, it is possible to move the air-mixing film member 15 on a bent path. Therefore, the air-conditioning case 1 is made compact in size, and the degree of freedom of layout of components of the vehicle air conditioner is increased. And at the same time, a mechanism for winding the air-mixing film member 15 is made unnecessary and the mechanism for driving the film member is greatly simplified.

(Second Preferred Embodiment)

Figure 4A:
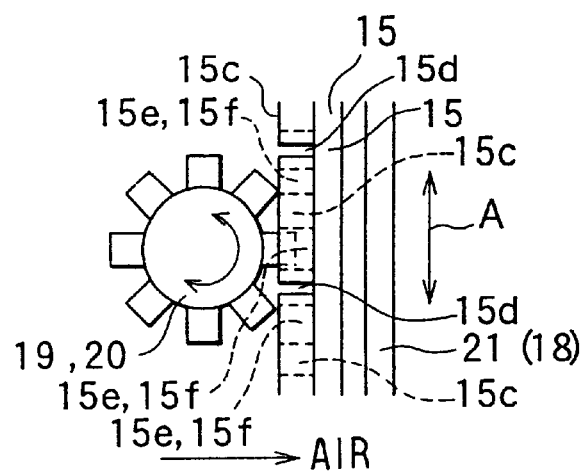
FIG. 4A is a side view showing a part around an air mixing film member according to a second preferred embodiment of the present invention.
Figure 4B:
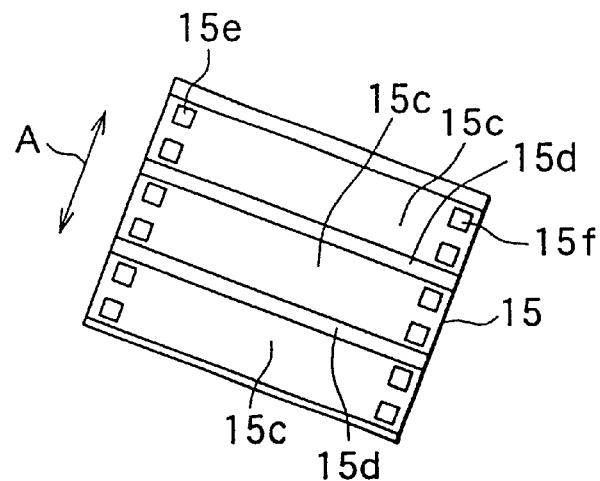
FIG. 4B is a top view of the film member in FIG. 4A.
Figure 4C:
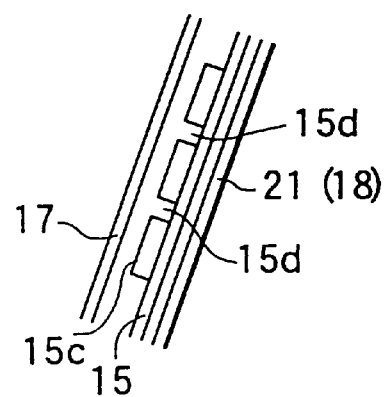
FIG. 4C is a side view showing the film member according to the second embodiment.

In the second embodiment, as shown in FIGS. 4A–4C, strengthening ribs (strengthening parts) 15c are formed on the opposite side of the air-mixing film member 15 from the sealing wall 21 of the air-conditioning case 1 (that is, on the upstream side of the air-mixing film member 15). These strengthening ribs 15c are relatively thick parts extending in the form of strips in the width direction of the film member (the axial direction of the driving shaft 16).

By the provision of the strengthening ribs 15c, the air-mixing film member 15 is strengthened and increased in rigidity. Consequently, bending of the air-mixing film member 15 to the downstream side under the airflow pressure of the blown air is effectively suppressed. Also, plural the strengthening ribs 15c are provided in the air-mixing film member 15 in the reciprocation direction A, and concavities 15d are formed between adjacent strengthening ribs 15c. Therefore, at these concavities 15d, the air-mixing film member 15 is thin and deforms easily. As a result, deformation of the air-mixing film member 15 as it moves is not hindered by the presence of the strengthening ribs 15c.

In addition, because concavities 15e and 15f for engaging with the teeth of the drive sprockets 19 and 20 are formed in the width direction ends of the strengthening ribs 15c of the air-mixing film member 15, the air-mixing film member 15 can be moved by rotation of the drive sprockets 19 and 20 in the same way as in the first embodiment. In the second embodiment, the other parts are similar to those of the above-described first embodiment.

(Third Preferred Embodiment)

Figure 5A:
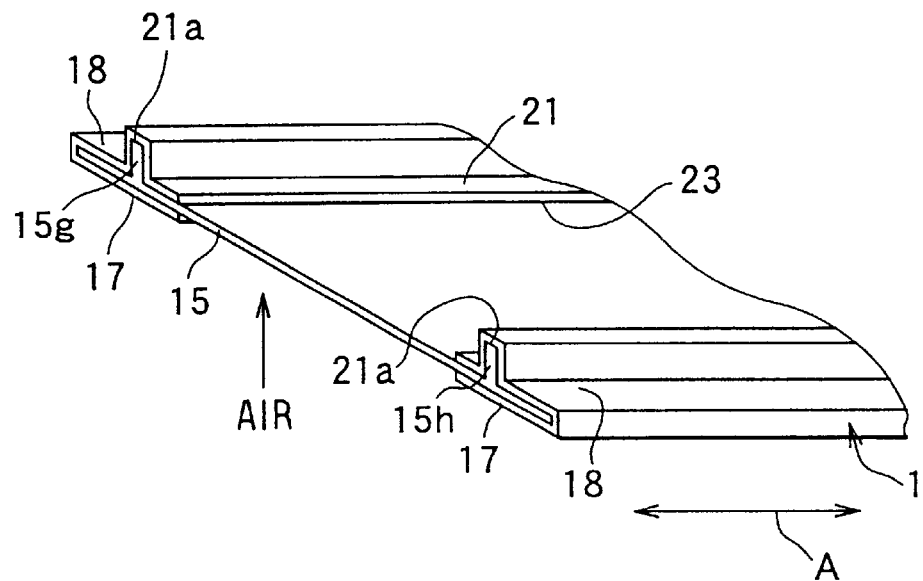
FIG. 5A is a perspective view showing a film member of an air passage opening/closing device according to a third preferred embodiment of the present invention.
Figure 5B:
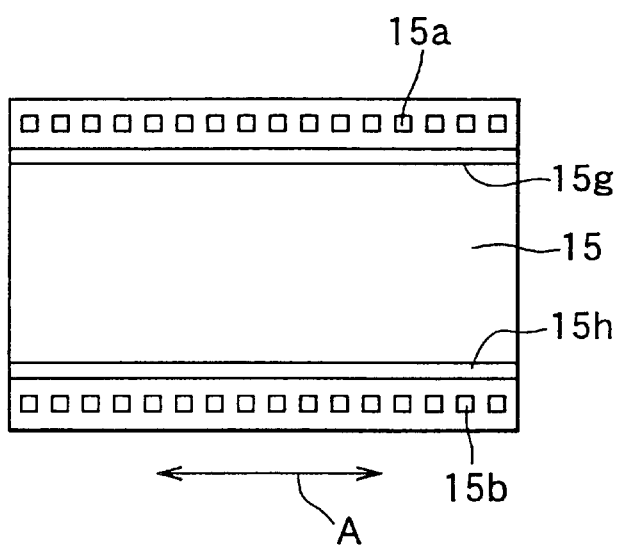
FIG. 5B is a top view of the film member according to the third embodiment.

FIGS. 5A and 5B show a film member according to the third embodiment. In the third embodiment, strengthening ribs (reinforcing parts) 15g and 15h extending in a direction parallel to the reciprocation direction A of the air-mixing film member 15 are formed at positions corresponding to the outer areas of the sealing wall 21 in the width direction of the air-mixing film member 15. The strengthening ribs 15g and 15h are formed so as to project from the surface of the air-mixing film member 15 on a side of the sealing wall 21 (the downstream side). On the other hand, concavities 21a are formed between the guide members 18 and the inner areas of the sealing wall 21, so that the strengthening ribs 15g and 15h are inserted into and engaged with these concavities 21a.

According to the third embodiment, the parts of the air-mixing film member 15 around the sprocket holes (drive transmitting parts) 15a and 15b with which the teeth of the drive sprockets 19 and 20 mesh are effectively strengthened and increased in rigidity by the strengthening ribs 15g and 15h.

Furthermore, in this case, the strengthening ribs 15g and 15h are positioned at locations in the width direction of the air-mixing film member 15, corresponding to the outer areas of the sealing wall 21. Therefore, at its parts facing the sealing wall 21 at the edge of the opening 23, the air-mixing film member 15 maintains a highly flexible state and consequently a sealing effect of the air-mixing film member 15 is obtained.

Also, the strengthening ribs 15g and 15h are engaged with the concavities 21a on the side of the sealing wall 21. Therefore, the end sides (the width direction ends) of the air-mixing film member 15 can be accurately prevented from slipping out from the guide, members 17 and 18, due to a bending of the air-mixing film member 15 to the downstream side under the airflow pressure of the blown air.

(Fourth Preferred Embodiment)

Figure 6A:
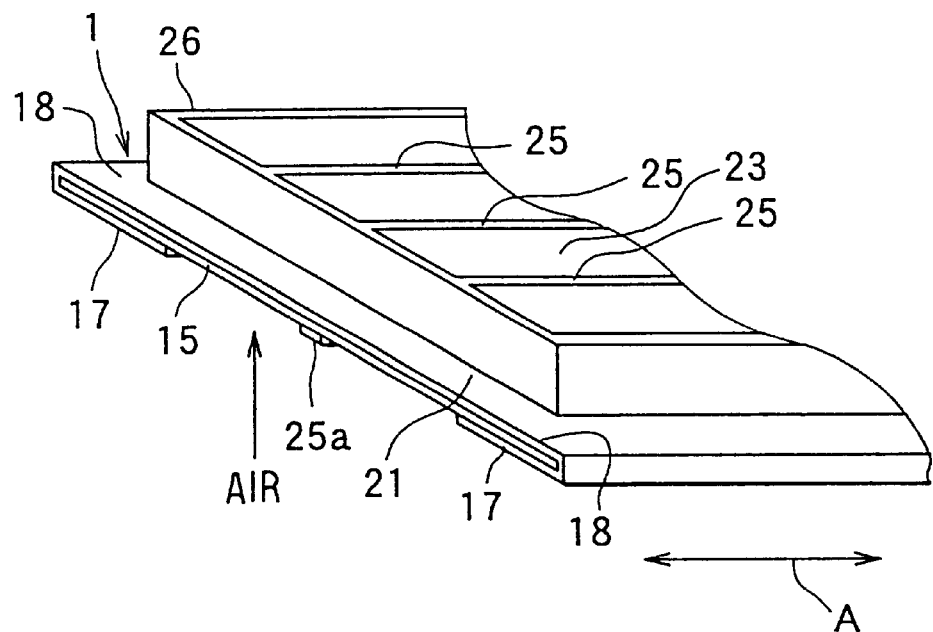
FIG. 6A is a perspective view showing an air passage opening/closing device according to a fourth preferred embodiment of the present invention.
Figure 6B:
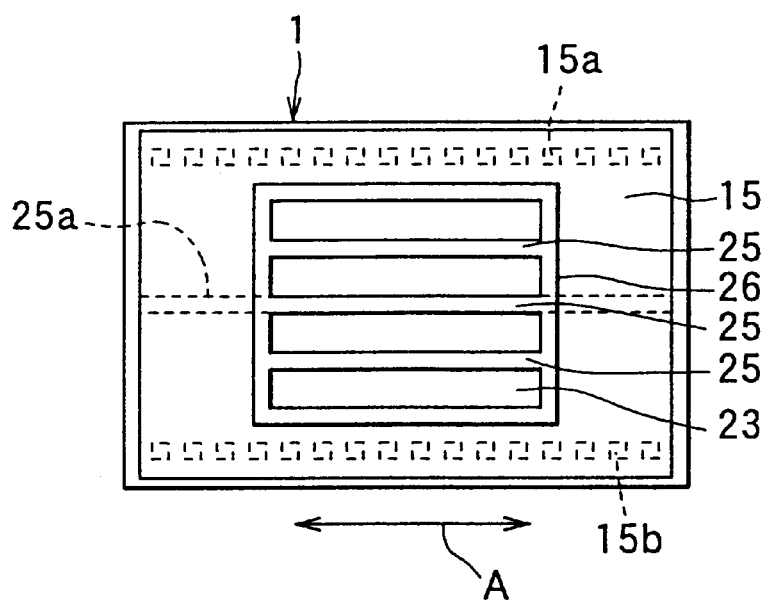
FIG. 6B is a top view of the air passage opening/closing device having a film member according to the fourth embodiment.

FIGS. 6A and 6B show a film member of the fourth embodiment. In the fourth embodiment, grid members 25 are provided in the opening 23 of the sealing wall 21 of the air-conditioning case 1, for suppressing deformation and bending of the air-mixing film member 15 under airflow pressure. In the example shown in FIGS. 6A, 6B, the grid members 25 consist of three plate members extending in a direction parallel to the reciprocation direction A of the air-mixing film member 15. By upstream side surfaces of the grid members 25 being made coplanar with the sealing wall 21, deformation of the air-mixing film member 15 under airflow pressure can be effectively suppressed. The grid members 25 are formed out of resin together with a rectangular frame part 26, integrally with the sealing wall 21 of the air-conditioning case 1.

When the ends of the air-mixing film member 15 are made free ends, it may happen that such a free end bends under its own weight to the upstream side. To overcome this problem, besides the grid members 25 on the downstream side described above, a grid member 25a may be provided on the upstream side of the air-mixing film member 15 also. In the fourth preferred embodiment, the upstream side grid member 25a is provided at a position facing a single, central grid member 25 among the grid members 25 on the downstream side.

As a result, the central part of the air-mixing film member 15 in the width direction is sandwiched between one downstream grid member 25 and the upstream grid member 25a. The upstream grid member 25a is provided integrally with the air-conditioning case 1 so as to extend in parallel with the reciprocation direction A of the air-mixing film member 15 over the entire operating range of the air-mixing film member 15.

Accordingly, even if a free end of the air-mixing film member 15 tends to bend under its own weight toward the upstream side, this bending is suppressed sufficiently by the upstream side grid member 25a. Consequently, the air-mixing film member 15 can be made to operate smoothly at all times.

Of course, alternatively a plurality of upstream side grid members 25a may be provided. Further, in the vicinity of the driving shaft 16 (and the drive sprockets 19, 20), the bending of the air-mixing film member 15 under its own weight is suppressed by support from the drive sprockets 19 and 20. Therefore, the upstream side grid member 25a does not necessarily have to be provided over the entire operating range of the air-mixing film member 15. Thus alternatively an upstream side grid member 25a may be provided only locally, where suppression of bending of the air-mixing film member 15 under its own weight is necessary.

(Fifth Preferred Embodiment)

Figure 7A:
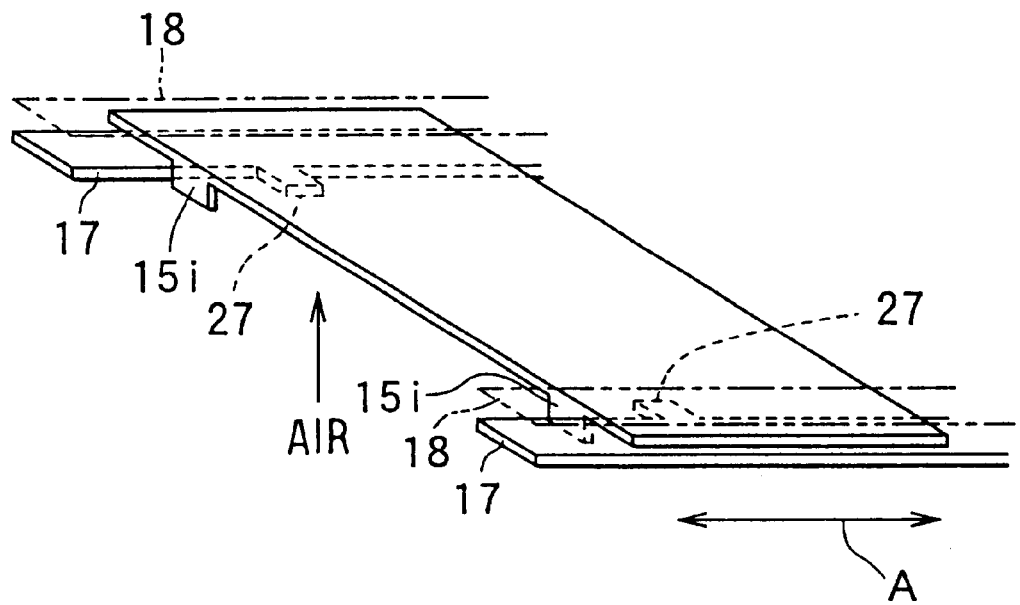
FIG. 7A is a perspective view showing an air passage opening/closing device according to a fifth preferred embodiment of the present invention.
Figure 7B:
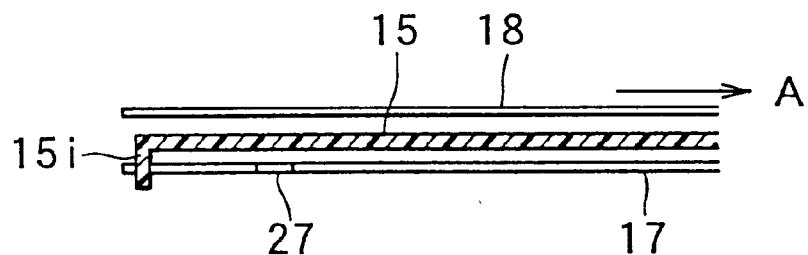
FIGS. 7B and 7C are views for explaining operation of a film member according to the fifth embodiment.
Figure 7C:
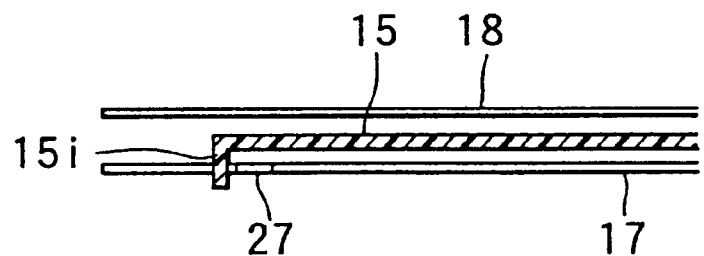

FIGS. 7A through 7C show a film member according to the fifth preferred embodiment. In the fifth embodiment, the air-mixing film member 15 is provided with stopper tabs (stopper means) 15i at an end thereof in the reciprocation direction A. These stopper tabs 15i are shaped by bending from the end in the reciprocation direction A of the air-mixing film member 15 at a predetermined width at two locations, as shown in FIG. 7A.

Stopper tabs (stopper means) 27 are also provided in the sealing wall 21 of the air-conditioning case 1, at the opening 23. Specifically, these stopper tabs 27 are formed so as to project into the opening 23 from the upstream side guide members 17.

Consequently, when the air-mixing film member 15 moves from the position shown in FIG. 7B in the reciprocation direction A and reaches the position shown in FIG. 7C, the stopper tabs 15i of the air-mixing film member 15 abut with the stopper tabs 27 on the case side, and the movement of the air-mixing film member 15 is thereby stopped at a predetermined position.

In FIGS. 7A through 7C, only stopper tabs 15i, 27 provided at one end of the air-mixing film member 15 in the reciprocation direction A are shown. However, by providing similar stopper tabs at the other end of the air-mixing film member 15 in the reciprocation direction A, it is possible to stop the movement of the air-mixing film member 15 with certainty at a predetermined position also when the air-mixing film member 15 moves in the opposite direction opposite to the direction A shown in FIG. 7B.

(Sixth Preferred Embodiment)

Figure 8A:
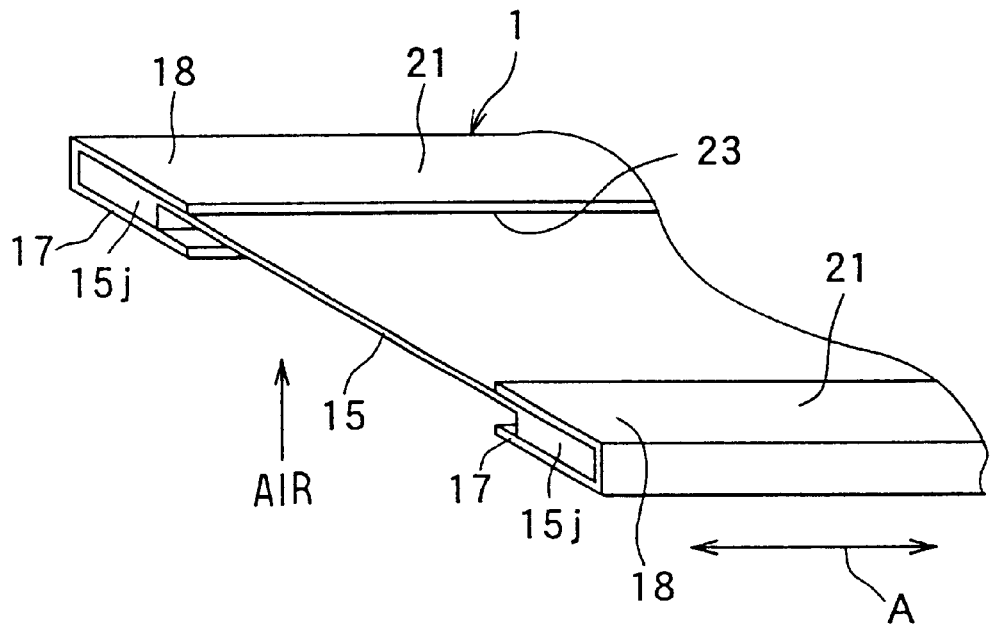
FIG. 8A is a perspective view showing an air passage opening/closing devoce according to a sixth preferred embodiment of the present invention.
Figure 8B:
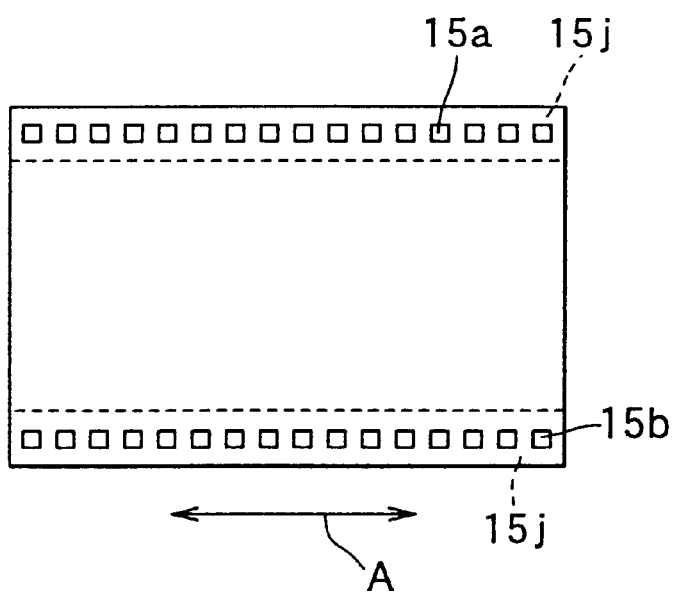
FIG. 8B is a top view of a film member according to the sixth embodiment.

FIGS. 8A and 8B show a film member according to a sixth preferred embodiment. In the sixth embodiment, the sheet thickness of side (width direction end) parts of the air-mixing film member 15, that is, driving force transmitting parts 15j around the sprocket holes 15a and 15b with which the teeth of the drive sprockets 19 and 20 mesh, is made larger than elsewhere. Therefore, the driving force from the drive sprockets 19 and 20 is accurately transmitted to the air-mixing film member 15.

As means for raising the rigidity of the driving force transmitting parts 15j of the air-mixing film member 15, instead of increasing their she:et thickness as described above, alternatively a material with a higher rigidity than that used for other parts may be used for the material of the driving force transmitting parts 15j. For example, the air-mixing film member 15 may be constructed using an elastomer material with a high rigidity for the driving force transmitting parts 15j, using a PET film with a low rigidity for the other parts, and bonding or two-color molding these two together integrally. Alternatively, a film thickness differential and a material difference may be combined.

In the sixth preferred embodiment, while strengthening of the driving force transmitting parts 15j is carried out by their sheet thickness being increased on the opposite side of the air-mixing film member 15 from the sealing wall 21 (the upstream side) or by the molding together of different materials, processing through which the sliding surface of the air-mixing film member 15 on the sealing wall 21 side (the downstream side surface) has a low coefficient of friction may be carried out. As a specific process for obtaining this low coefficient of friction, a coating layer of a low-friction material such as silicon may be applied to the surface of the sliding surface of the air-mixing film member 15 on the sealing wall 21 side, or means such as affixing a nylon woven cloth can be employed. The effect of this will now be discussed.

When the ends of the air-mixing film member 15 are made free ends, it is necessary for the air-mixing film member 15 to have a rigidity, that is, a hardness, needed for the air-mixing film member 15 to be fed along the guide members 17 and 18. On the other hand, the harder is the air-mixing film member 15, the greater is the friction between the air-mixing film member 15 and the guide members 17 and 18 and the greater is the operating force needed to feed out the air-mixing film member 15.

At the same time, the harder is the air-mixing film member 15, the more the air-mixing film member 15 takes on a persistent deformation matching the shape of the guide members 17 and 18 and, as a result, the quality of contact between the air-mixing film member 15 and the sealing wall 21 deteriorates and abnormal noise is produced.

However, according to the sixth preferred embodiment, by strengthening of the driving force transmitting parts 15j being carried out on the opposite side of the air-mixing film member 15 from the sealing wall 21, the rigidity needed for feeding out of the air-mixing film member 15 is secured. These driving force transmitting parts 15j are also effective in providing the air-mixing film member 15 with strength to take driving forces from the drive sprockets 19 and 20.

As shown in FIG. 8B, the driving force transmitting parts 15j are formed only at the sprocket holes 15a, 15b positioned along the sides (the width direction ends) of the air-mixing film member 15, but the driving force transmitting parts 15j are not formed on the part of the air-mixing film member 15 facing the opening 23 in the sealing wall 21. Therefore, the rigidity of the main central part (i.e., the sealing part) of the air-mixing film member 15 can be made low. Because of this, the central sealing part of the air-mixing film member 15 can be prevented from taking on a persistent deformation matching the guide members 17 and 18.

The sliding surface of the air-mixing film member 15 on the sealing wall 21 side is provided with parts processed to have low friction. Therefore, the friction between the sliding surface of the air-mixing film member 15 and the guide member 18 on the downstream side can be reduced, and the force needed to operate the air-mixing film member 15 can be lowered.

Further, as a result of this reduction in friction (and lowering of the required operating force), the part of the air-mixing film member 15 on the leading side (the part in front of the drive sprockets 19 and 20 in the reciprocation direction A) moves smoothly, and the force acting on the leading side is reduced. Accordingly, it becomes unnecessary for the air-mixing film member 15 to be made very hard, and thus the air-mixing film member 15 can be further prevented from taking on a persistent deformation.

In the sixth preferred embodiment and the preceding first through fifth preferred embodiments, the air-mixing film member 15 is driven to reciprocate by sprocket holes 15a, 15b being provided in driving force transmitting parts 15j of the air-mixing film member 15 and teeth of drive sprockets 19 and 20 being made to mesh with these sprocket holes 15a, 15b. However, alternatively, the air-mixing film member 15 may be driven to reciprocate by teeth in the form of a rack extending in parallel with the reciprocation direction A being formed integrally with driving force transmitting parts 15j according to the sixth preferred embodiment, and the teeth of the drive sprockets 19 and 20 being made to mesh with these rack teeth.

In this case, it is not necessary for sprocket holes 15a, 15b to be provided in the driving force transmitting parts 15j. Furthermore, because there is a strengthening effect of the integrally molded racks of teeth, a still greater strength improvement can be achieved by the provision of the driving force transmitting parts 15j.

(Seventh Preferred Embodiment)

Figure 9:
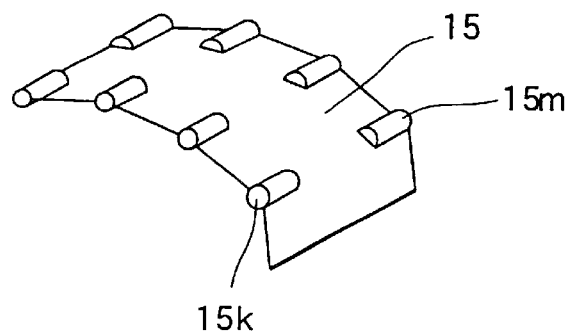
FIG. 9 is a perspective view of a film member according to a seventh preferred embodiment of the present invention.

FIG. 9 shows a film member of the seventh preferred embodiment. In the seventh embodiment, cylindrical parts (i.e., partial contact parts) 15k, 15m having a diameter greater than the sheet thickness of the air-mixing film member 15 are formed only at the side ends (i.e., the width direction ends) of the air-mixing film member 15.

According to the seventh embodiment, because these cylindrical parts 15k, 15m alone make contact locally with the guide members 17 and 18, the sliding friction of the air-mixing film member 15 is reduced and the force needed to operate the air-mixing film member 15 can be lowered. Furthermore, because the cylindrical parts 15k and 15m have a strengthening rib effect, they also raise the rigidity of the air-mixing film member 15.

Since the cylindrical parts 15k and 15m are only formed at both the side ends (i.e., the width direction ends) of the air-mixing film member 15, a flat surface is formed in the central part widthwise of the air-mixing film member 15, and the flat surface can be made to contact the sealing wall 21 on the case side. Consequently, there is no loss of the sealing action of the air-mixing film member 15 due to the formation of the cylindrical parts 15k and 15m.

(Eighth Preferred Embodiment)

Figure 10:
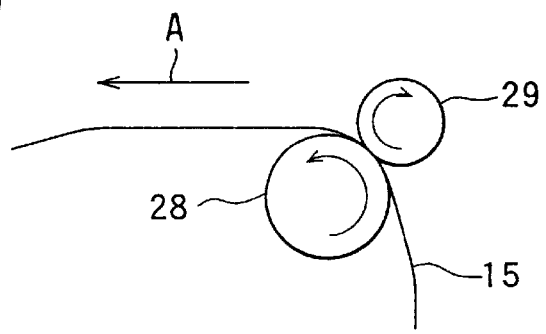
FIG. 10 is a schematic diagram for explaining a driving mechanism of a film member according to an eighth preferred embodiment of the present invention.

FIG. 10 shows a driving mechanism according to the eighth preferred embodiment. In the eighth embodiment, as the driving mechanism for transmitting driving force from the driving shaft 16 to the air-mixing film member 15, a pair of rubber rollers 28 and 29 having large frictional coefficients are used instead of the drive sprockets 19 and 20, and the air-mixing film member 15 is moved by being sandwiched between a driving side rubber roller 28 and an auxiliary rubber roller 29. In the eighth embodiment, the other parts are similar to those of the above-described first embodiment.

(Ninth Preferred Embodiment)

The ninth embodiment will be now described with reference to FIGS. 11–15. In the above-described first embodiment, as shown in FIGS. 1 and 2A through 2C, the gaps between the air-mixing film member 15 and the guide members 17 and 18 (the inner wall surfaces of the air-conditioning case 1) are the same in the receiving space 24 where sealing is unnecessary, as they are at the sealing wall 21 (the edge of the opening 23) where sealing is necessary. However, when an airflow pressure of blown air acts on the air-mixing film member 15, it may happen that the air-mixing film member 15 is pressed onto the sealing wall 21 over a large area, and the force needed to operate the air-mixing film member 15 consequently increases.

Conversely, in the receiving space 24, because the influence of airflow pressure decreases with progress toward the back of the receiving space 24, it may happen that the end (free end) of the air-mixing film member 15 repeats a motion of irregularly striking and leaving the inner wall surface of the air-conditioning case 1 and makes a flapping sound.

To avoid this, in the following ninth preferred embodiment, an operation force reducing structure is provided to reduce the operating force of the air-mixing film member 15 in the receiving space 24 and to suppress any flapping sound.

Figure 11:
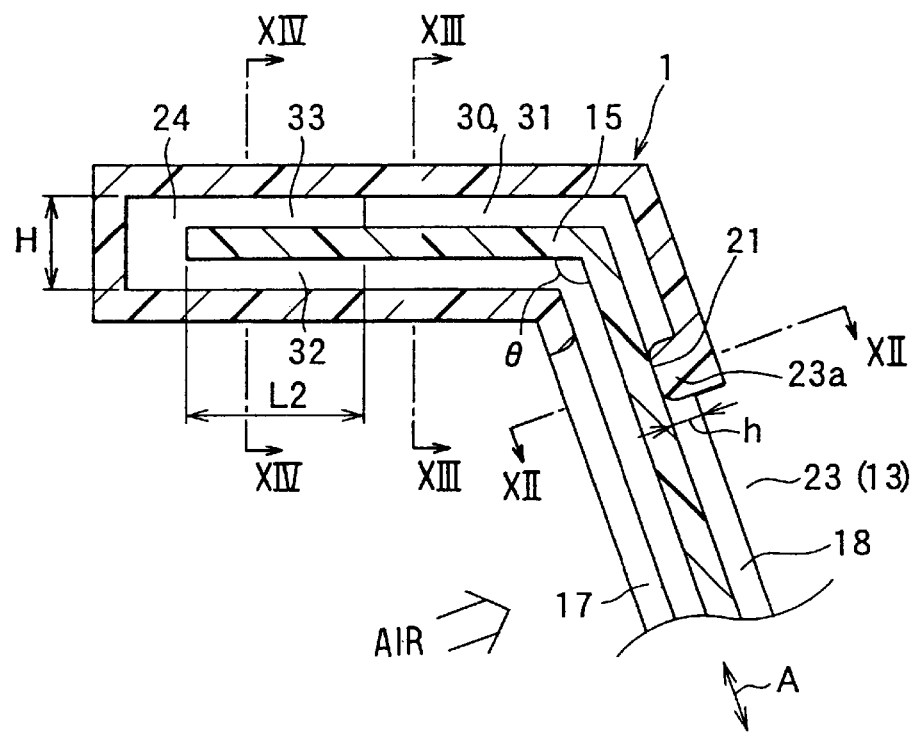
FIG. 11 is a sectional view of a space portion for accommodating a film member according to a ninth preferred embodiment of the present invention.
Figure 12:
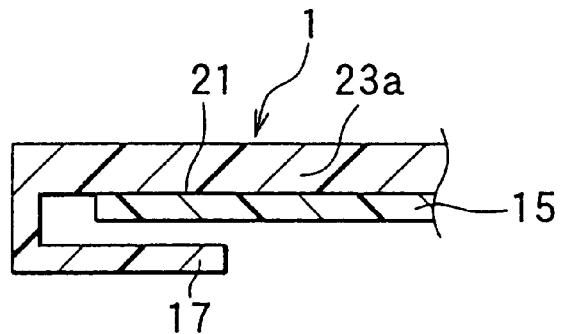
FIG. 12 is a cross-sectional view taken along line XII—XII in FIG. 11.
Figure 13:
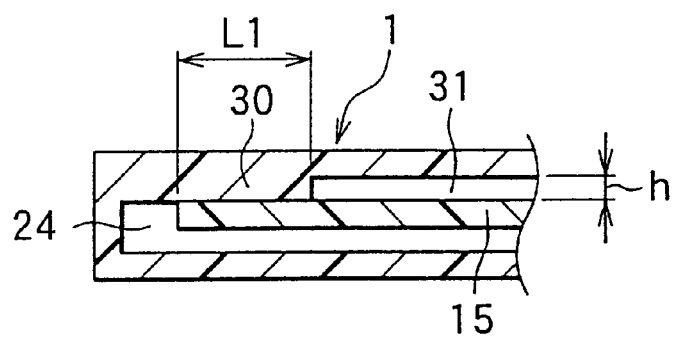
FIG. 13 is a cross-sectional view taken along line XIII—XIII in FIG. 11.
Figure 14:
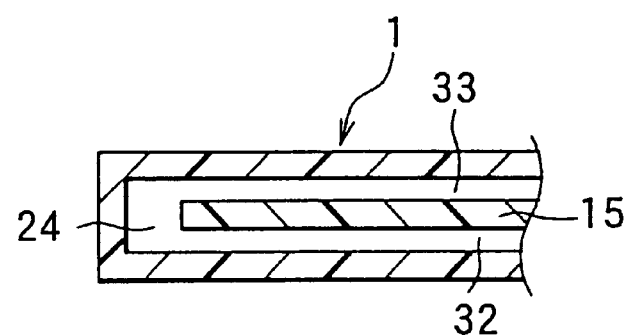
FIG. 14 is a cross-sectional view taken along line XIV—XIV in FIG. 11.

FIG. 11 is an enlarged detail view of the receiving space 24 according to the ninth preferred embodiment, during the maximum heating shown in FIG. 2. FIGS. 12, 13 and 14 respectively are sectional views taken along the lines XII—XII, XIII—XIII and XIV—XIV in FIG. 11.

Figure 15:
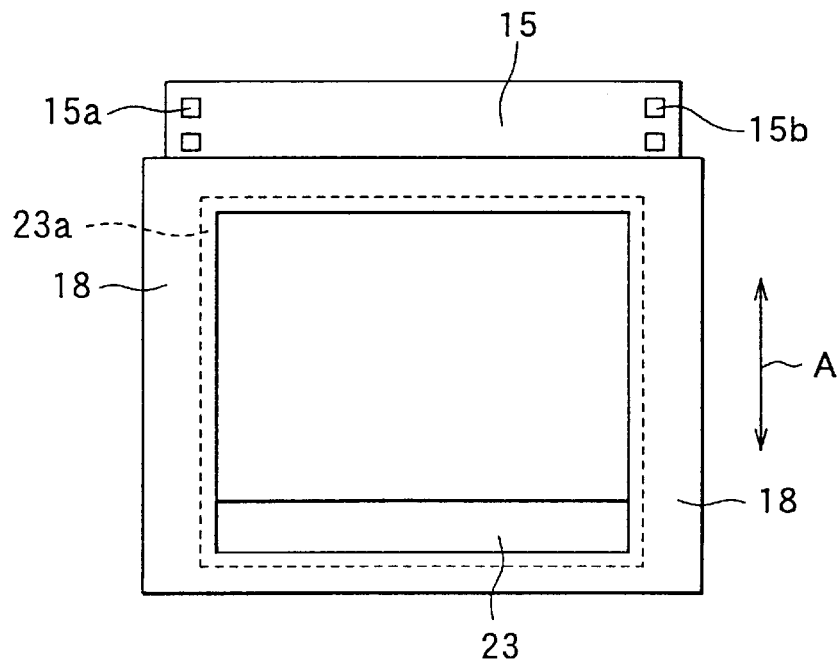
FIG. 15 is a schematic front view showing a position relationship between an opening of an air-conditioning case and a film member according to the ninth embodiment.

Here, the opening 23 on the side of the air-conditioning case 1 constructs the cool air bypass passage 13, and a raised part 23a (i.e., protrusion) pointing toward the downstream surface of the air-mixing film member 15 is formed all the way around the edge of the opening 23. FIG. 15 shows the raised part 23a formed around the opening 23 with a dashed line.

The height h of the raised part 23a is set, so that at least when an airflow pressure acts on the air-mixing film member 15, the top surface of the raised part 23a makes contact with the air-mixing film member 15. Thus, the top surface of the raised part 23a constitutes the sealing wall 21 in each of the preferred embodiments described above.

In the ninth preferred embodiment, the top surface of the raised part 23a is made the same height as the surfaces of the downstream side guide members 18. However, the top surface of the raised part 23a may alternatively be made somewhat higher than the surfaces of the downstream side guide members 18. In this case, the top surface of the raised part 23a and the surfaces of the guide members 18 should be connected by a gentle sloping surface.

Also, on the downstream side of the air-mixing film member 15, a step guide 30 is formed on the inner wall surface of the air-conditioning case 1, extending from the position of the raised part 23a toward the back of the receiving space 24. The step guide 30 has the same height h as the height h of the raised part 23a, as shown in FIGS. 11 and 13.

As shown in FIG. 13, the step guide 30 is formed only at the width direction (the left-right direction in FIG. 13) ends of the air-mixing film member 15. Consequently, in the central part widthwise of the air-mixing film member 15, a gap 31 is formed between the air-mixing film member 15 and the inner wall surface of the air-conditioning case 1 on the downstream side of the air-mixing film member 15. The gap 31 is about 1 mm to 3 mm in size (=height h). In FIG. 13, only the step guide 30 at one side end (width direction end) of the air-mixing film member 15 is indicated. In FIG. 13, the length L1 over which the step guide 30 and the air-mixing film member 15 make surface contact is for example about 5 mm to 20 mm.

Further, back inside the receiving space 24, the step guide 30 is discontinued and gaps 32 and 33 are formed between the upstream and downstream side surfaces of the air-mixing film member 15 and inner wall surfaces of the air-conditioning case 1. These gaps 32, 33 are also about 1 mm to 3 mm in size. In the maximum heating state in FIG. 11 (i.e. when the air-mixing film member 15 has been received into the receiving space 24), the length L2 of the non-contacting part, unsupported by the step guide 30, of the end of the air-mixing film member 15 in reciprocation direction A is for example about 50 mm.

Next, some effects of the ninth preferred embodiment will be described. Because the raised part 23a is formed all the way around the opening 23, when an airflow pressure of blown air inside the air-conditioning case 1 acts on the air-mixing film member 15 in the maximum heating shown in FIG. 11, the air-mixing film member 15 makes surface contact with the top of the raised part 23a (the sealing wall 21). Consequently, air flowing toward the opening 23 can be certainly sealed by the air-mixing film member 15 and a good sealing effect is obtained.

Also, over the range in the reciprocation direction A, where the step guides 30 are formed inside the receiving space 24, the side ends (the width direction ends) of the air-mixing film member 15 are supported by the step guides 30. Accordingly, the air-mixing film member 15 is prevented from flapping irregularly against the inner wall surfaces of the air-conditioning case 1 inside the receiving space 24. Consequently, the production of a flapping noise arising from such irregular flapping of the air-mixing film member 15 is suppressed.

Furthermore, when the airflow pressure is applied, the side ends (i.e., the width direction ends) of the air-mixing film member 15 are supported by the step guides 30 only at the entrance end of the receiving space 24. In this case, at the back end of the receiving space 24, the air-mixing film member 15 does not make contact with the case inner wall surfaces due to the gaps 31 through 33. Thus, the frictional forces arising between the air-mixing film member 15 and the inner wall surfaces of the air-conditioning case 1 are lowered, and the force needed to operate the air-mixing film member 15 is reduced even when the airflow pressure is applied.

Although the non-contacting part (the length L2 of FIG. 11) is provided behind the step guide 30 by means of the gaps 32 and 33, because the height H of the receiving space 24 is a small dimension of 10 mm or, less, the influence of the airflow pressure acting on the air-mixing film member 15 at the back of the receiving space 24 is small. Consequently, no flapping noise arises due to the influence of airflow pressure. Accordingly, at the back of the receiving space 24, it is preferable to give priority to operating force reduction over flapping noise prevention and to make the end of the air-mixing film member 15 to a non-contacting part.

(Modification of Ninth Preferred Embodiment)

In the foregoing description of the ninth preferred embodiment, gaps 32 and 33 are provided over a predetermined range L2 at the back of the receiving space 24 to provide the air-mixing film member 15 with a non-contacting part. However, alternatively, the air-mixing film member 15 may make contact partially with or make surface contact with the inner wall surfaces of the air-conditioning case 1 over the range of the predetermined length L2.

And although the step guides 30 are formed only at the side ends (i.e., the width direction ends) of the air-mixing film member 15, alternatively they may also be formed partially at the central part of the air-mixing film member 15, as well as at the side ends. Alternatively, the positions of the step guides 30 may be shifted from the side ends of the air-mixing film member 15 toward the center.

In the ninth preferred embodiment described above, the step guides 30 are disposed only on the downstream side of the air-mixing film member 15. However, the step guides 30 may also be added on the upstream side of the air-mixing film member 15. That is, because the influence of airflow pressure is small inside the receiving space 24, when the bend angle θ of the air-mixing film member 15 in FIG. 11 is small, it may happen that the end of the air-mixing film member 15 bulges inside the receiving space 24 toward the upstream side and makes contact with a case inner wall surface. To avoid this, under this kind of condition, step guides 30 may be added on the upstream side of the air-mixing film member 15 inside the receiving space 24 to prevent such problems.

Further, in the ninth preferred embodiment described above, the raised part 23*a*, the step guides 30 and the gaps 32 and 33 are formed in this order from the position of the opening 23 toward the back of the receiving space 24. However, when the influence of airflow pressure inside the receiving space 24 is small, because the production of flapping noise is small, the step guides 30 may be dispensed with.

Conversely, when the influence of the airflow pressure is large even at the back of the receiving space 24, step guides 30 may be formed all the way to the back of the receiving space 24, and the gaps 32 and 33 may be dispensed with.

(Tenth Preferred Embodiment)

In the above-described first embodiment, the driving shaft 16 and the drive sprockets 19 and 20 are disposed on the upstream side of the air-mixing film member 15, as shown in FIG. 3A. Consequently, when the air-mixing film member 15 bends toward the downstream side under an airflow pressure, there may be a tendency for the drive sprockets 19 and 20 to slip out from the sprocket holes 15*a*, 15*b* in the air-mixing film member 15 and for the drive sprockets 19 and 20 to rotate idly.

Figure 16:
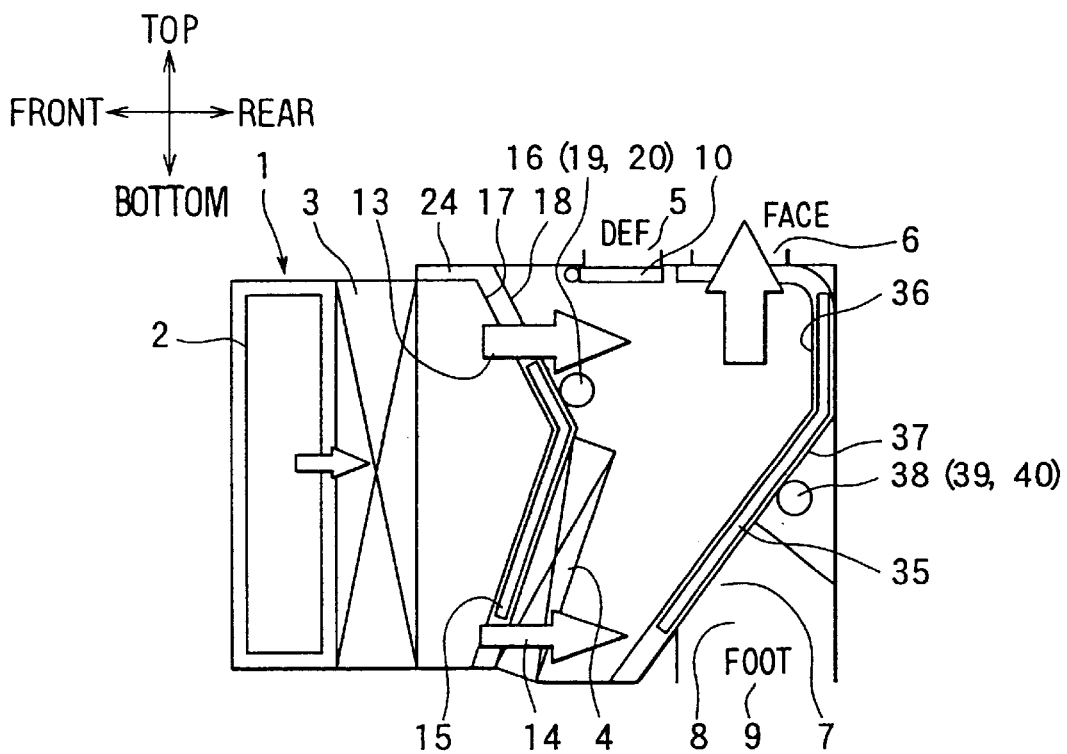
FIG. 16 is a schematic sectional view showing a vehicle air conditioner according to a tenth preferred embodiment of the present invention.
Figure 17A:
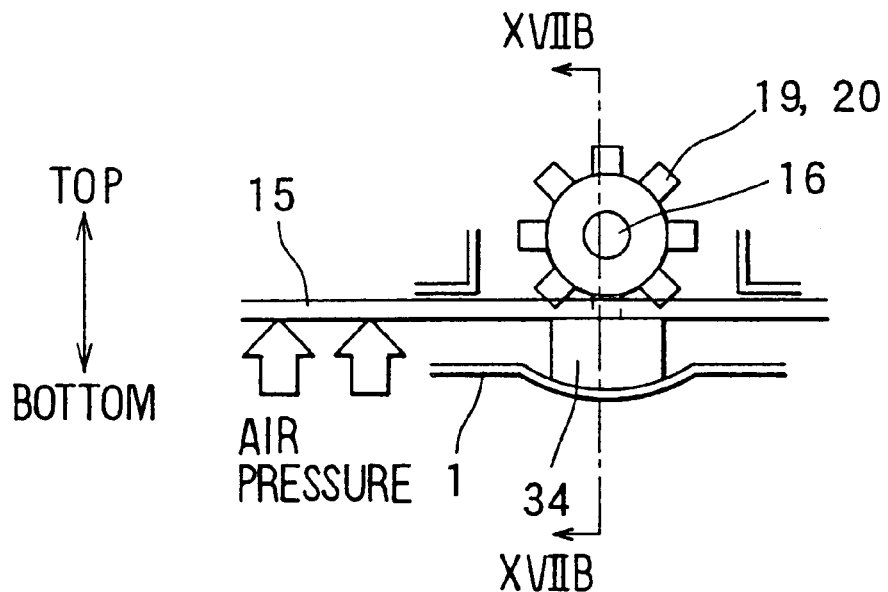
FIG. 17A is a schematic sectional view showing an air passage opening/closing device for an air mixing according to the tenth embodiment.
Figure 17B:
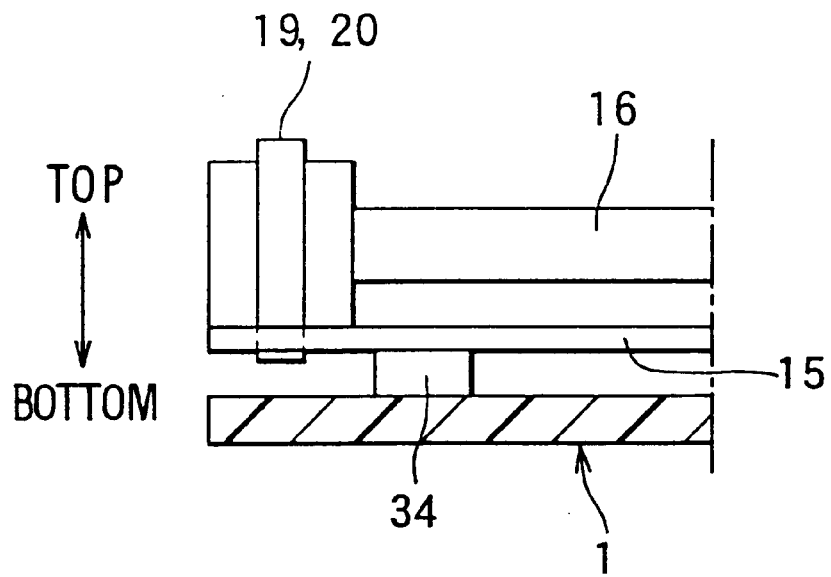
FIG. 17B is a cross-sectional view taken along line XVIIB—XVIIB in FIG. 17A.

To avoid this, in the tenth preferred embodiment, as shown in FIGS. 16, 17A and 17B, the driving shaft 16 and the drive sprockets 19 and 20 of the driving member are disposed on the downstream side of the air-mixing film member 15. Accordingly, the air-mixing film member 15 is pushed by airflow pressure to the tooth bottoms of the drive sprockets 19 and 20, and the engagement state between the drive sprockets 19 and 20 and the sprocket holes 15*a* and 15*b* of the air-mixing film member 15 is accurately maintained. As a result, idle rotation of the drive sprockets 19 and 20 can be prevented.

FIGS. 17A and 17B are enlarged detail views of the vicinity of the driving shaft 16 and the drive sprockets 19, 20 of the driving member in FIG. 16. The vehicle air conditioner including the driving shaft 16 and the drive sprockets 19, 20 of the driving member is mounted on the vehicle in the arrangement in FIGS. 16, 17A and 17B in the vertical and front-rear directions.

This vehicle-mounted state is such that the drive sprockets 19, 20 are positioned above the air-mixing film member 15. Therefore, when the blower (not shown) of the vehicle air conditioner is stopped (when there is no airflow pressure), the air-mixing film member 15 bends under its own weight downward, that is, away from the drive sprockets 19 and 20. Because of this, there is a risk of the drive sprockets 19 and 20 slipping out from the sprocket holes 15*a*, 15*b* of the air-mixing film member 15.

To avoid this, in the tenth preferred embodiment, as shown in FIGS. 17A and 17B, pressing members 34 are disposed on the upstream side, i.e. the lower side, of the air-mixing film member 15, to prevent the air-mixing film member 15 from bending under its own weight away from the drive sprockets 19 and 20.

Here, the pressing members 34 are disposed in the proximity of the drive sprockets 19 and 20. For example, in the disposition example shown in FIG. 17B, the pressing member 34 is disposed offset by a predetermined amount inwardly in the axial direction (to the right) from the position of the respective drive sprocket 19 or 20. However, alternatively, the pressing member 34 may be disposed offset by a predetermined amount outwardly in the axial direction (to the left) from the position of the respective drive sprocket 19 or 20.

Alternatively, the pressing members 34 may be disposed on both the left side and the right side in the axial direction of each of the drive sprockets 19 and 20. By the pressing members 34 being disposed offset by a predetermined amount in the axial direction from the positions of the drive sprockets 19 and 20, interference between the pressing members 34 and the drive sprockets 19 and 20 is avoided.

The pressing members 34 can be formed integrally with an inner wall surface of the air-conditioning case 1. However, in cases such as when removal from resin molding dies is difficult, the pressing members 34 may be molded separately from the air-conditioning case 1 and then otherwise bonded to the inner wall surface of the air-conditioning case 1.

In the above-described first embodiment, the delivery ports 5 through 7 are opened and closed by outlet mode doors 10, 11 and 12. However, in the tenth embodiment, among these outlet mode doors 10, 11 and 12, the function of the outlet mode doors 11 and 12 is performed by a film member (i.e., second film member) 35 for outlet mode switching.

The film member 35 is similar to the air-mixing film member (i.e., first film member) 15. As shown in FIG. 16, the film member 35 has guide members 36, 37 similar to the guide members 17 and 18, a driving shaft 38 similar to the driving shaft 16, and drive sprockets 39, 40 similar to the drive sprockets 19 and 20.

As a result, the film member 35 can be moved up and down along the guide members 36 and 37 by rotation of the drive sprockets 39 and 40. With the reciprocating movement of the film member 35, the face port 6 and the foot port 7 can be opened and closed. Further, since the driving shaft 38 and the drive sprockets 39 and 40 of the driving member can be disposed in a dead space between the face port 6 and the foot port 7, as shown in FIG. 16, the arrangement is beneficial in reducing the size of the air conditioner.

Figure 18A:
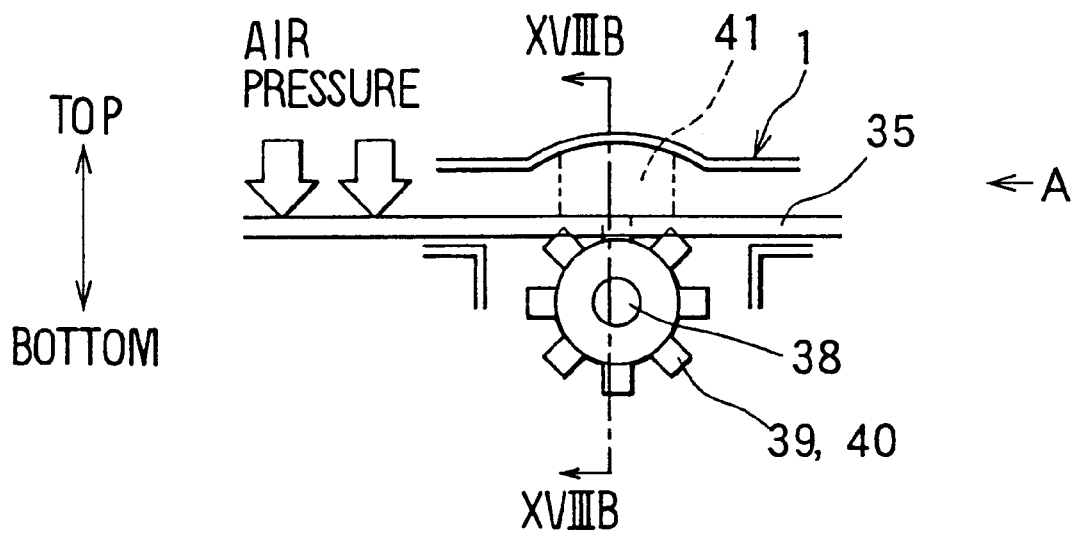
FIG. 18A is a schematic sectional view showing an air passage opening/closing device for an air outlet mode according to the tenth embodiment.
Figure 18B:
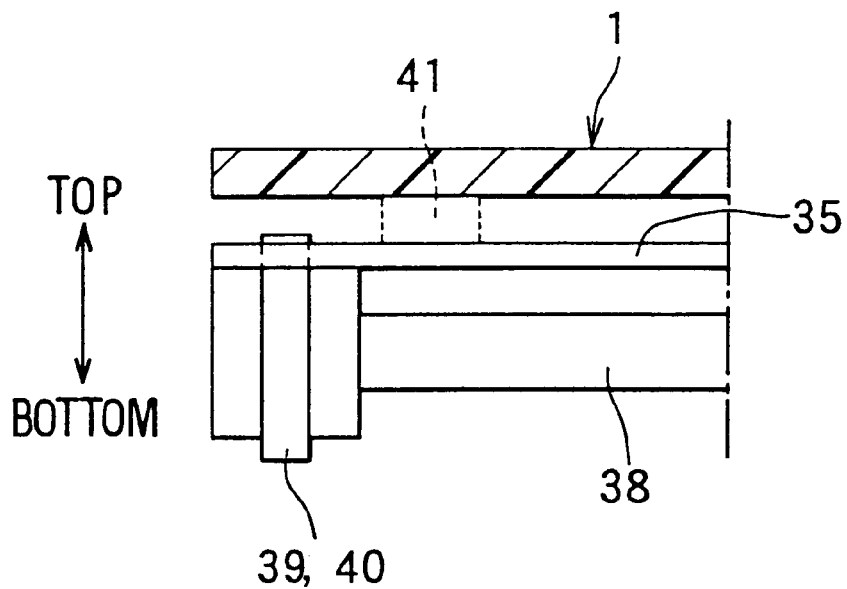
FIG. 18B is a cross-sectional view taken along line XVIIIB—XVIIIB in FIG. 18A.

FIGS. 18A and 18B are enlarged views showing details of the vicinity of the drive sprockets 39 and 40 for the mode switching film member 35. These drive sprockets 39 and 40 are positioned on the downstream side of the film member 35 and also are positioned below the film member 35. Consequently, when the blower (not shown) of the vehicle air conditioner is operating, (when there is an airflow pressure), the film member 35 is pressed toward the tooth bottoms of the drive sprockets 39 and 40. On the other hand, when the blower of the vehicle air conditioner is not operating (when there is no airflow pressure), the film member 35 bends under its own weight downward, that is, again toward the tooth bottoms of the drive sprockets 39 and 40.

Thus, with this mounting state of the drive sprockets 39 and 40 for the mode switching film member 35, there is no slipping out of the drive sprockets 39 and 40 due to bending of the film member 35 under its own weight. Therefore, pressing members similar to the pressing members 34 described above in connection with the air-mixing film member 15 are generally unnecessary.

However, if pressing members 41 similar to the pressing members 34 described above are provided at positions proximate to the drive sprockets 39 and 40, the slipping of the drive sprockets 39 and 40 can be prevented more certainly. For example, by the addition of pressing members 41, it is possible to prevent slipping of the drive sprockets 39 and 40 caused by vehicle vibration and the like.

In the tenth embodiment, the drive sprockets 19, 20, 39 and 40 are disposed on the downstream sides of the film members 15, 35, so that an effect of preventing slipping of the drive sprockets 19, 20, 39 and 40 is obtained by utilizing airflow pressure pressing the film members 15 and 35 toward the tooth bottoms of the drive sprockets 19, 20, 39 and 40. To obtain this anti-slipping action more effectively, the film members 15 and 35 may be moved only when the air-conditioning blower is operating.

Specifically, an air-conditioning electronic control unit (ECU), for controlling a drive motor of the blower, the drive motor of the air-mixing film member 15 and the drive motor of the mode-switching film member 35, is provided. Further, a control program of the air-conditioning ECU is set, so that operating signals is outputted from the air-conditioning ECU to the drive motors of the film members 15 and 35, only when an operating signal is outputted from the air-conditioning ECU to the drive motor of the blower.

(Eleventh Preferred Embodiment)

The eleventh preferred embodiment particularly relates to the specific construction of the pressing members 34 and 41 of the film members 15 and 35, similarly to the above-described tenth embodiment.

Figure 19:
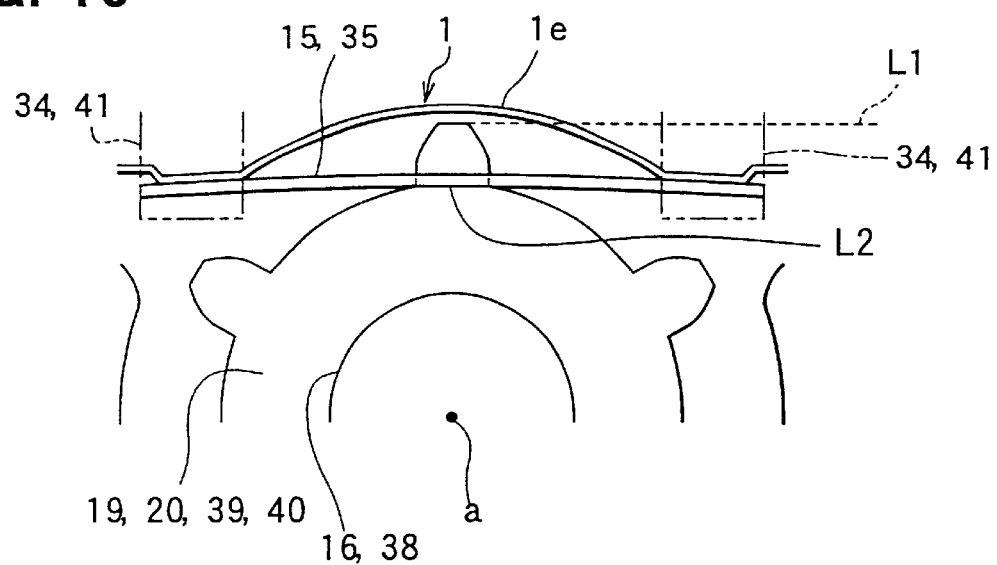
FIG. 19 is an enlarged view of a driving member of an air passage opening/closing device according to an eleventh preferred embodiment of the present invention.

FIG. 19 is an enlarged view of a drive sprocket 19, 20, 39 or 40 (i.e., driving member), in which an arc-shaped sprocket cover part 1e covering a portion of the circumference of the drive sprocket 19, 20, 39 or 40 is formed on the air-conditioning case 1.

Pressing members 34 or 41 are disposed in two locations on circumferential extensions of the arc-shaped sprocket cover part 1e. The height of these pressing member 34 or 41 is set so that the tops (the pressing surfaces) of the pressing member 34 or 41 are positioned at least on the sprocket center "a" side from the tooth tip line L1 of the drive sprocket 19, 20 or 39, 40.

Here, if the height of the pressing members 34 and 41 is set so that the tops (the pressing surfaces) of the pressing members 34 and 41 are positioned on the sprocket center "a" side from the tooth bottom line L2 of the drive sprocket 19, 20, 39 and 40, an effect of preventing the sprocket slipping from the film member 15 and 35 can be obtained more certainly.

Figure 20:
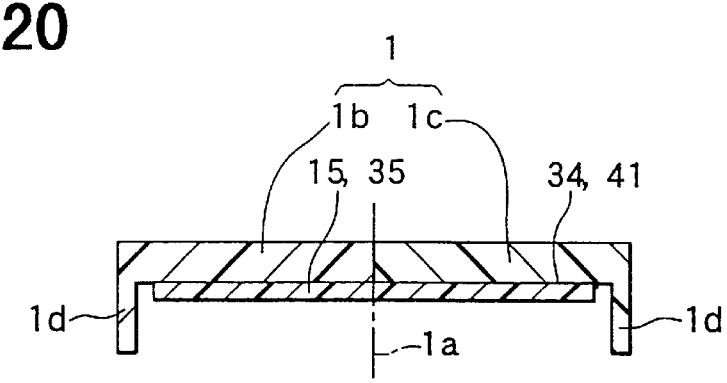
FIG. 20 is a sectional view showing an arrangement example of a pressing member for pressing a film member according to the eleventh embodiment.

In FIG. 20, a division surface 1a of an air-conditioning case 1 is set in the width-direction (the left-right direction in FIG. 20) center of the film member 15, 35, and left and right division cases 1b, 1c are bonded together integrally to make the air-conditioning case 1 after being separately molded. When the air-conditioning case 1 having the left and right division cases 1b, 1c is used, the pressing members 34 and 41 can be formed extending over the entire width of the film member 15 and 35, for example, as shown in FIG. 20.

Figure 21:
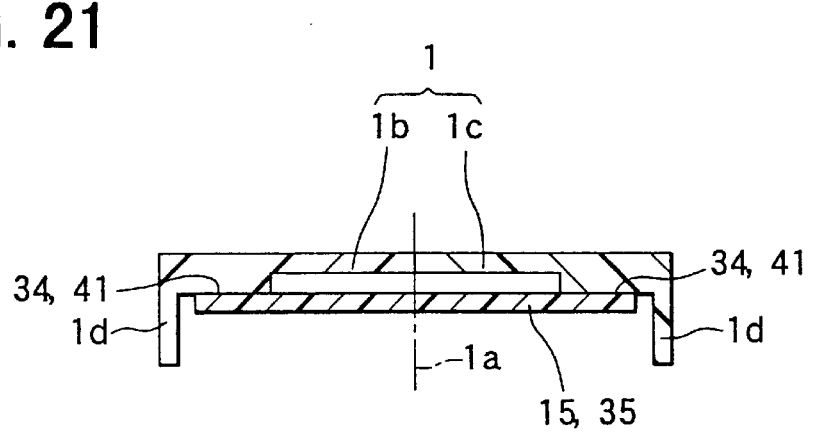
FIG. 21 is a sectional view showing an another arrangement example of the pressing member according to the eleventh embodiment.
Figure 22:
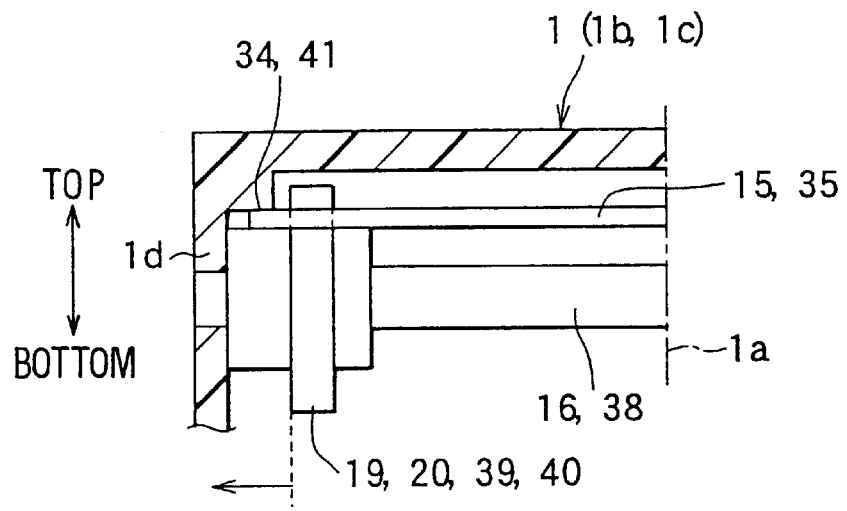
FIG. 22 is an enlarged view showing the pressing member in FIG. 21.

Further, in the examples shown in FIGS. 21 and 22, the pressing members 34 and 41 are formed only at the side ends (i.e., the width direction ends) of the film member 15 and 35. That is, the pressing members 34, 41 are disposed axially outward of the drive sprockets 19, 20 or 39, 40, and the side ends (i.e., the width direction ends) of the film member 15, 35 are pressed upon by the pressing members 34 and 41. Therefore, the pressing member 34 or 41 can be formed continuously with the side walls 1d of the left and right division cases 1b and 1c.

Figure 23A:
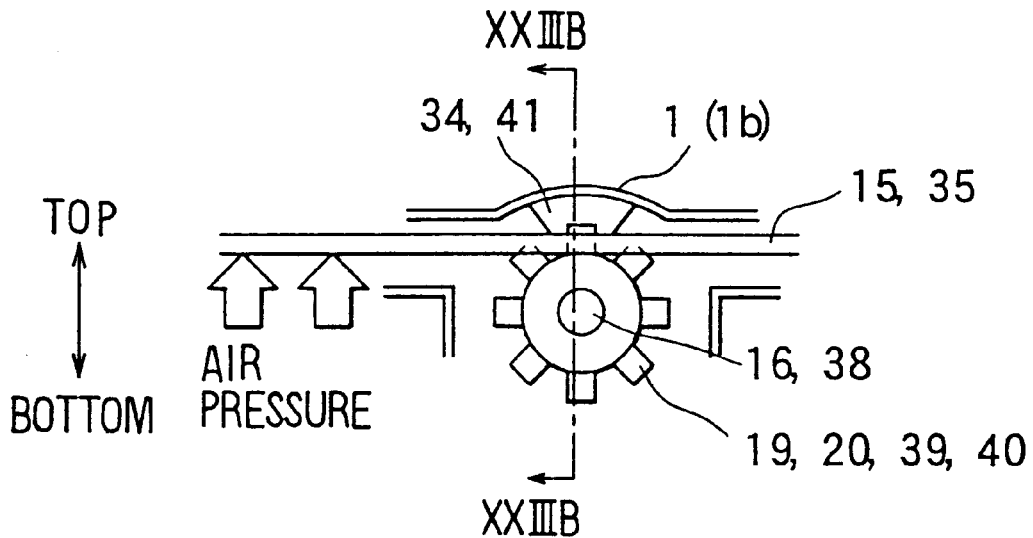
FIG. 23A is a schematic sectional view showing an air passage opening/closing device.
Figure 23B:
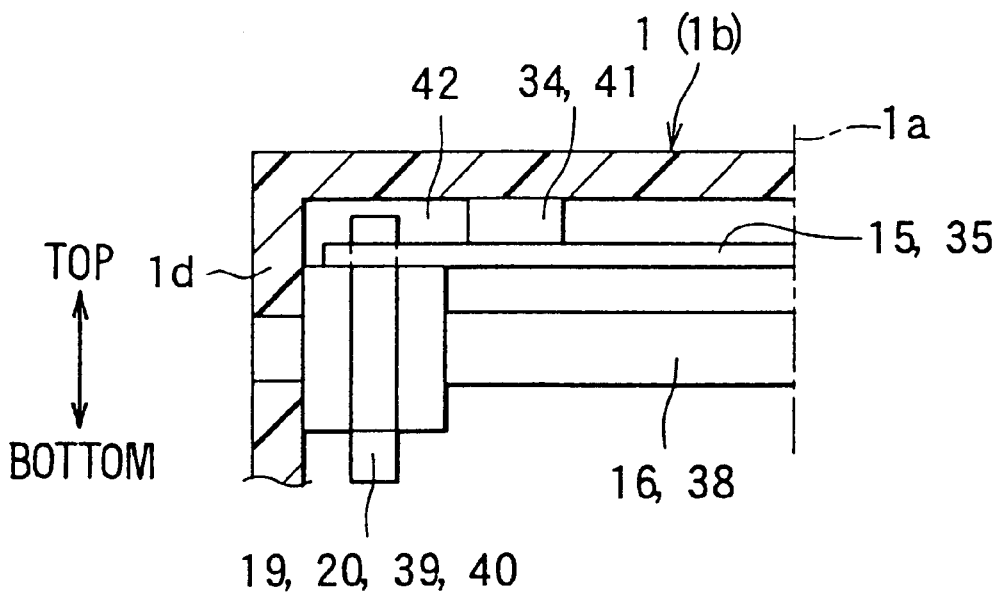
FIG. 23B is a sectional view showing a further another arrangement example of the pressing member according to the eleventh embodiment.

In FIGS. 23A and 23B, the pressing members 34, 41 are disposed axially inward of the drive sprockets 19, 20 or 39, 40. Therefore, the film member 15 or 35 is pressed by the pressing members 34, 41 at locations; axially inward of the drive sprocket 19, 20, 39 and 40.

With this arrangement shown in FIGS. 23A and 23B, a recess 42 is formed between each of the pressing members 34 and 41 and the respective side wall id of the air-conditioning case 1. In the resin-molding of the half-cases 1b and 1c, the recess 42 constitutes an undercut which cannot be molded with die removal carried out in the left-right direction of FIG. 23B, and leads to an increase in molding cost.

Therefore, in the case shown in FIGS. 23A and 23B, preferably, the pressing members 34 and 41 are molded separately from the division cases 1b. Thereafter, these separate pressing members 34 and 41 are connected to inner surfaces of the division cases 1b and 1c by means such as adhesive. In other words, the pressing members 34 and 41 do not have to be molded integrally with the air-conditioning case 1 (the division cases 1b, 1c), and may alternatively be molded separately from the air-conditioning case 1.

In the example shown in FIG. 20 and in the examples shown in FIGS. 21 and 22, because there is no undercut (recessed part) with respect to die removal in the left-right direction of the figures, the pressing members 34 and 41 can be molded integrally with the left and right division cases 1b, 1c using a simple mold, and this is advantageous to cost reduction. However, even in the examples of FIGS. 20 through 22, as necessary, the pressing members 34 and 41 may alternatively be molded as separate parts.

In FIG. 22, the pressing members 34 and 41 are disposed only axially outward of the drive sprockets 19, 20, 39 and 40. On the other hand, in FIG. 23, the pressing members 34, 41 are disposed only axially inward of the drive sprockets 19, 20, 39 and 40. However, the pressing members 34, 41 may alternatively be disposed both axially inward and axially outward of the drive sprockets 19, 20, 39 and 40, to obtain a still more certain effect of pressing upon the film member 15, 35.

(Twelfth Preferred Embodiment)

Figure 24:
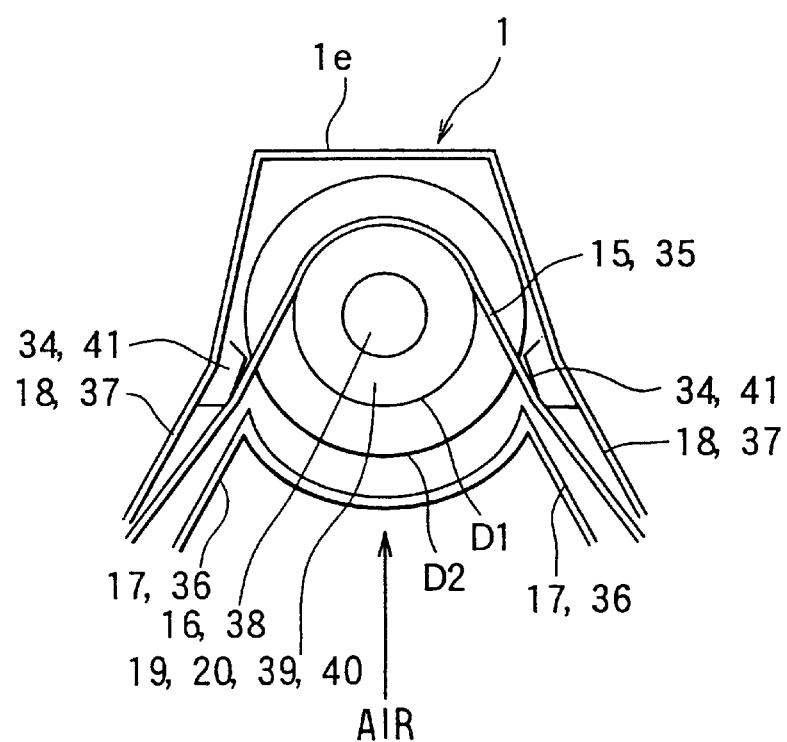
FIG. 24 is a schematic sectional view showing a driving gear of an air passage opening/closing device according to a twelfth preferred embodiment of the present invention.

The twelfth preferred embodiment shown in FIG. 24 is a modification of the above-described eleventh embodiment. That is, in the above-described eleventh embodiment, a sprocket cover part 1e covering a circumferential portion of the drive sprocket 19, 20, 39, 40 in the air-conditioning case 1 is molded in the arc shape corresponding to the circumference of the sprocket 19, 20, 39, 40, as shown in FIG. 19. However, in the twelfth preferred embodiment, the sprocket cover part 1e of the air-conditioning case 1 is molded in a trapezoidal shape, as shown in FIG. 24.

Further, the guide members 17, 18, 36 and 37 also do not have to be straight and can alternatively be made curved. In FIG. 24, D1 is the tooth bottom circle of the drive sprocket 19, 20, 39, 40, and D2 is the tooth tip circle of the drive sprocket 19, 20, 39, 40.

(Thirteenth Preferred Embodiment)

The thirteenth preferred embodiment relates to a driving member arrangement for making the air-conditioning unit compact. In the above-described first embodiment, leakage of air to the opening 23 through the sprocket holes 15a, 15b of the air-mixing film member 15 is prevented by the drive sprockets 19 and 20 being disposed outward of the opening 23. However, with this kind of layout, to secure installation space for the drive sprockets 19 and 20, the air-conditioning case 1 may be made large. Alternatively, when there is a restriction on the size of the air-conditioning case 1, the opening area of the opening 23 may be reduced, leading to a fall in the air-conditioning capacity of the air conditioner.

In view of this, in the thirteenth preferred embodiment, the drive sprockets are disposed by effectively using dead space inside the air-conditioning case 1. Therefore, the size of the air conditioner can be made compact, or the area opened and closed by the film member can be increased so that the air-conditioning capacity of the air conditioner is improved.

Figure 25:
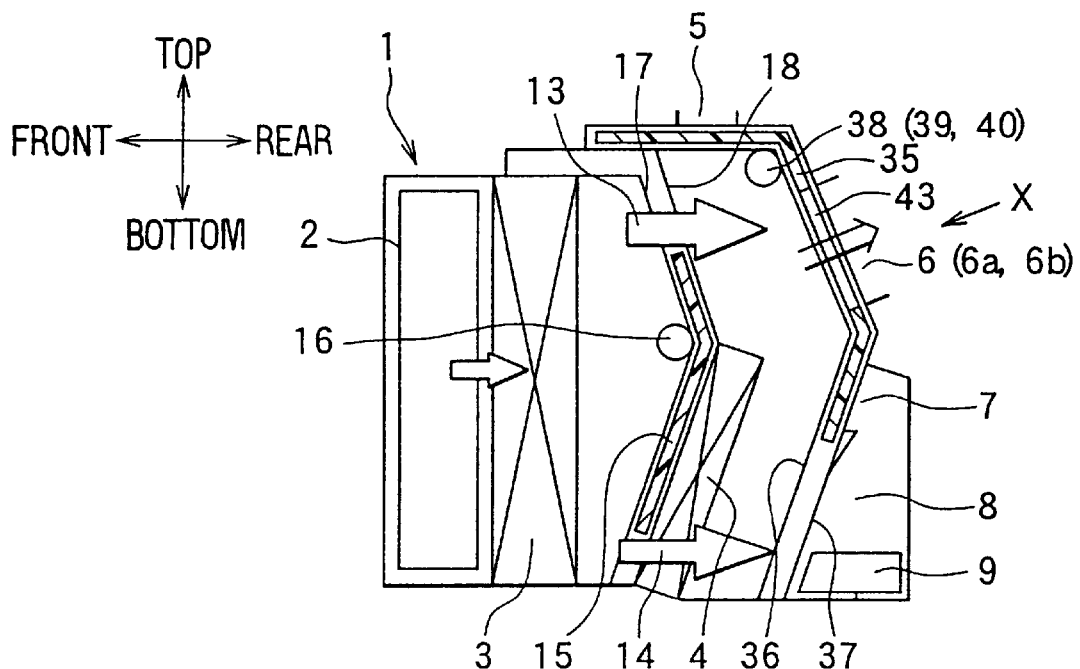
FIG. 25 is a schematic sectional view showing a vehicle air conditioner during a face mode, according to a thirteenth preferred embodiment of the present invention.
Figure 26:
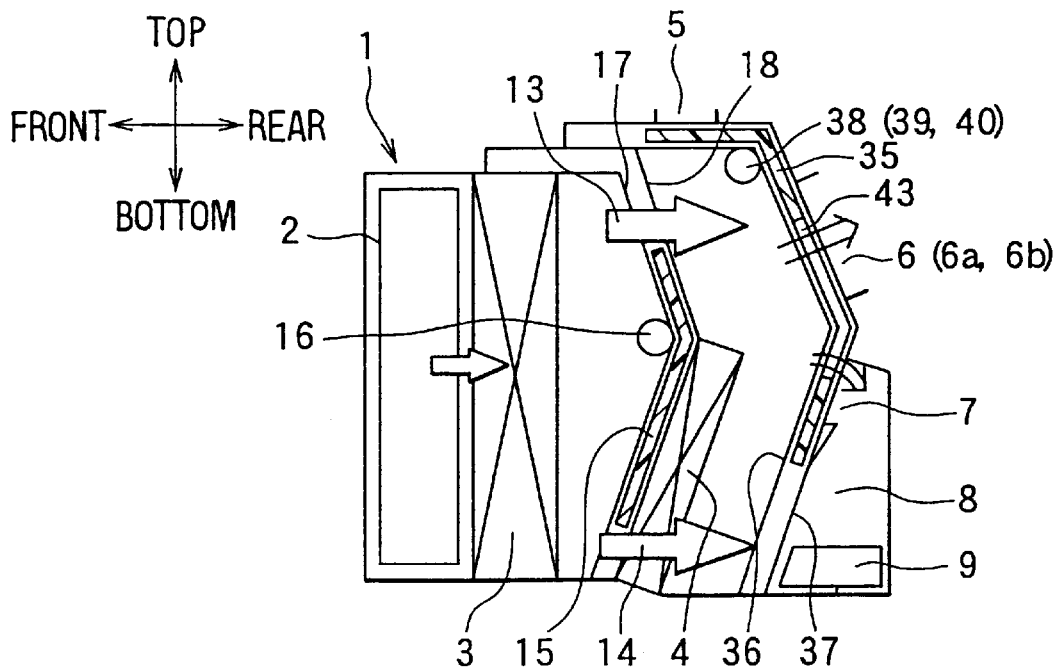
FIG. 26 is a schematic sectional view showing the vehicle air conditioner during a bi-level mode according to the thirteenth embodiment.
Figure 27:
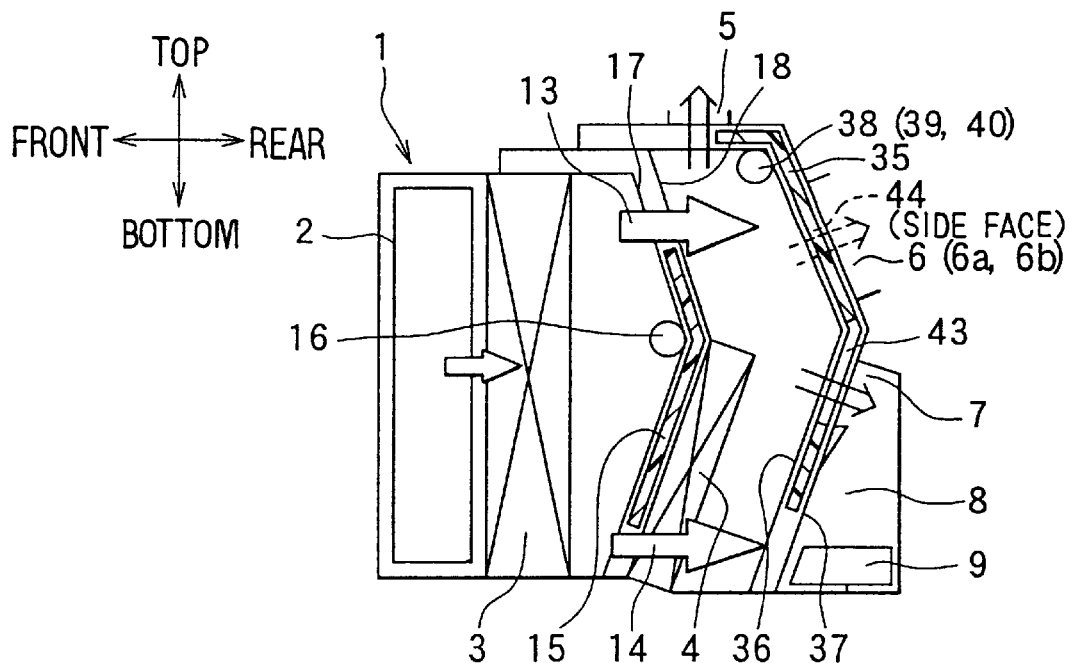
FIG. 27 is a schematic sectional view showing the vehicle air conditioner during a foot mode according to the thirteenth embodiment.
Figure 28:
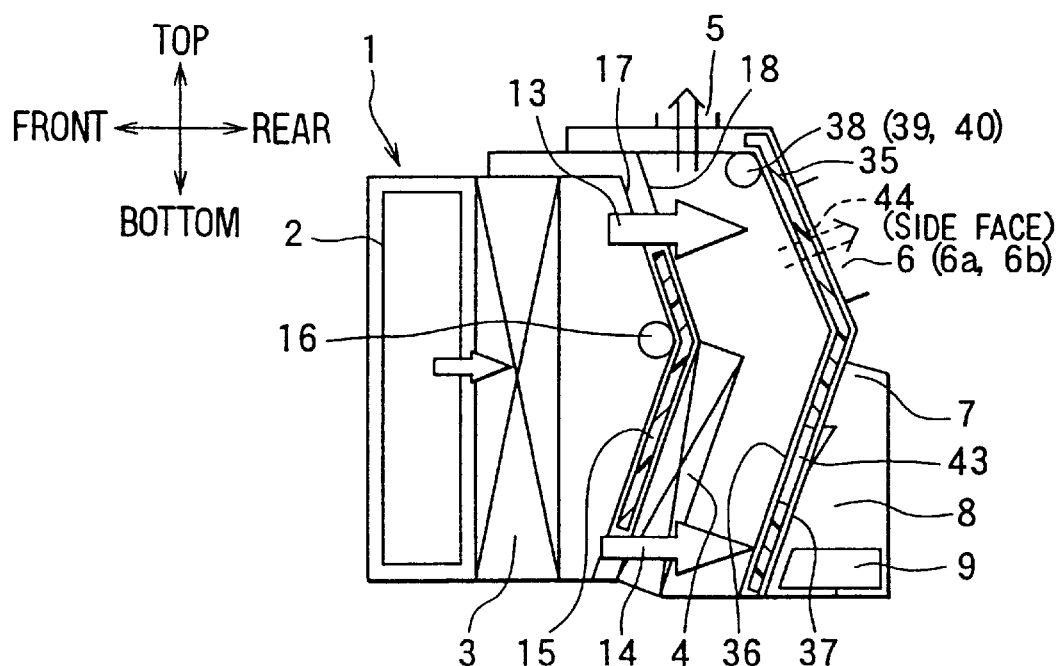
FIG. 28 is a schematic sectional view showing the vehicle air conditioner during a defroster mode according to the thirteenth embodiment.
Figure 29:
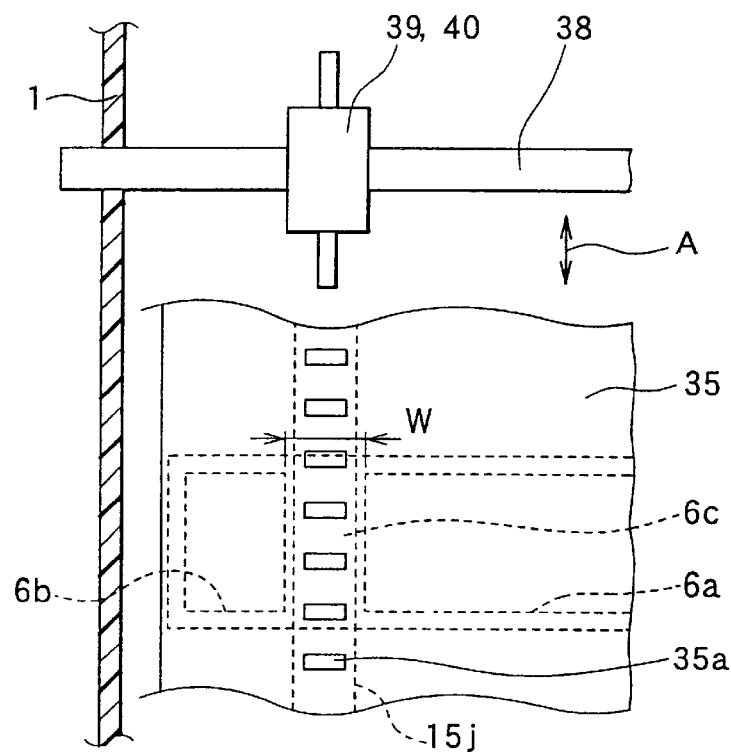
FIG. 29 is a view when being viewed from arrow X in FIG. 25.
Figure 30:
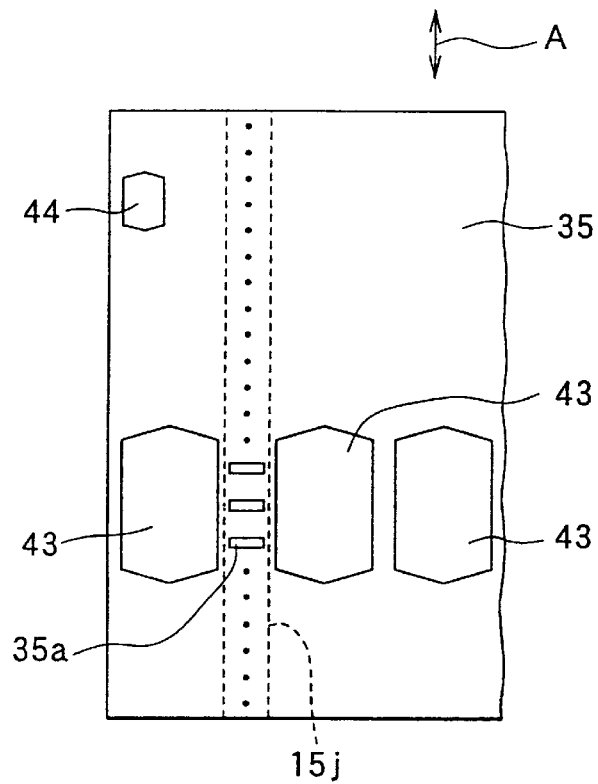
FIG. 30 is a front view of a film member for switching an air outlet mode, showing opening patterns, according to the thirteenth embodiment.

The driving member disposition of the thirteenth embodiment is applied to a mode switching film member 35. FIGS. 25 through 28 respectively show a face (FACE) mode, a bi-level (B/L) mode, a foot (FOOT) mode and a defroster (DEF) mode of the vehicle air conditioner, switched by the mode switching film member 35. FIG. 29 is a view showing the left side half of the vehicle air conditioner when being viewed from the arrow X in FIG. 25, and FIG. 30 is a view showing a pattern of openings in the left side half of the mode switching film member 35.

Firstly, the specific construction of the face port 6 of the air-conditioning case 1 will be described with reference to FIG. 29. The face port 6 has a center face port 6a disposed at a center in the width direction (perpendicular to the reciprocation direction A) of the film member 35, and a side face port 6b disposed to each of the left and right sides of the center face port 6a.

Here, the center face port 6a is connected by a center face duct (not shown) to a center face outlet in the center of the dashboard, so that conditioned air can be blown toward the face side of a passenger in the passenger compartment through the center face outlet. The side face ports 6b are connected by side face ducts (not shown) to side face outlets at the left and right ends of the dashboard, so that conditioned air can be blown through these side face outlets toward the side upper sides of the passenger compartment or toward side windshields of the vehicle.

The side face outlets have airflow direction changing mechanisms for changing the direction of the conditioned air and also have manually operable shutter mechanisms for shutting off conditioner air when it is not required. Because of this, the side face ports 6b can be always opened so that air can be blown from the side face ports 6b in all of the outlet modes shown in FIGS. 25 through 28.

As shown by the opening patterns of the film member 35 in FIG. 30, main openings 43 for opening and closing the delivery ports 5, 6 (6a, 6b) and 7 are provided in the mode switching film member 35 to be lined in the width direction of the film member. Also, auxiliary openings 44 for opening the side face ports 6b during the foot mode of FIG. 27 and the defroster mode of FIG. 28 are provided at positions shifted from the main openings 43 in the reciprocation direction A.

In the air-conditioning case 1, as shown in FIG. 29, a dividing part 6c for partitioning the center face port 6a and the left side face port 6b, and a dividing part 6c for partitioning the center face port 6a and the right side face port 6b, normally, have a width W of at least 10 mm. Through the dividing parts 6c, the center face ducts and the side face ducts are connected. The width W of these dividing parts 6c is dead space which does not contribute to the opening area of the center face port 6a or the side face ports 6b.

Accordingly, in the thirteenth preferred embodiment, drive sprockets 39, 40 are disposed at positions in the width direction of the film member 35 on extension lines of the dividing parts 6c. On the other hand, sprocket holes 35a are provided to be engaged with the drive sprockets 39, 40 at positions on extension lines of the dividing parts 6c in the film member 35.

Accordingly, the driving member including the drive sprockets 39 and 40 and the sprocket holes 35a, for driving the film member 35, can be disposed within the widths of the dividing parts 6c which is dead space. Because it is not necessary for a dedicated space to be provided for disposing the driving member, the air-conditioning case 1 can be made smaller by a corresponding amount. Alternatively, if the air-conditioning case 1 is not to be made smaller, the opening area of the center face port 6a and the side face ports 6b can be increased by an amount corresponding to the unnecessary dedicated space for disposing the driving member. In this case, an increase in air-conditioning capacity can be achieved through a reduction in the airflow resistance and a resulting increase in airflow.

Because the sprocket holes 35a of the film member 35 are covered by the wall surfaces of the dividing parts 6c, there is no leakage of air to the center face port 6a through the sprocket holes 35a. Further, when a width dimension of the defroster port 5 in the width direction of the film member 35 is set not greater than the width dimension of the center face port 6a, and when the defroster port 5 is provided centrally in the width direction of the film member 35, it can prevent air from being leaked through the auxiliary openings 44 and the sprocket holes 35a to the defroster port 5.

The foot port 7 also may be divided in the width direction of the film member 35 into a center foot port and left and right side foot ports, similarly to the relationship between the center face port 6a and the side face ports 6b. Even in this case, dividing parts having the same width as the dividing parts 6c are provided between the center foot port and the left and right side foot ports. Further, the sprocket holes 35a are positioned over these dividing parts, so that an air leakage through the sprocket holes 35a to the foot port 7 is accurately prevented.

In the thirteenth embodiment, driving force transmitting parts 15j extending in the reciprocation direction A of the film member 35 are provided in the vicinities where the sprocket holes 35a are formed in the film member 35, as shown in FIGS. 29 and 30. The driving force transmitting parts 15j of the thirteenth embodiment have increased rigidity similarly to the driving force transmitting parts 15j of FIGS. 8A and 8B. That is, the sheet thickness of the vicinities where the sprocket holes 35a are formed is made larger than that of the rest of the film member or a material having relatively high rigidity is used, so that the rigidity of the driving force transmitting ports 15j is improved.

The driving force transmitting parts 15j of FIGS. 29 and 30 and the driving force transmitting parts 15j of FIGS. 8A and 8B are used for strengthening the parts of the film member 35 where the sprocket holes 35a are formed in the reciprocation direction A. Therefore, the driving force transmitting parts 15j also perform the role of the strengthening ribs 15g, 15h of FIGS. 5A and 5B.

The driving force transmitting parts 15j of the thirteenth preferred embodiment, unlike those of FIGS. 8A and 8B, have the characteristic that they are positioned away from the sides of the film member 35 in its width direction, i.e. in locations facing the dividing parts 6c between the center face port 6a and the side face ports 6b.

(Fourteenth Preferred Embodiment)

The following fourteenth preferred embodiment, similarly to the above-described thirteenth embodiment, relates to a driving member arrangement advantageous to making the air-conditioning unit compact.

In the above-described thirteenth embodiment, because the side face outlets have manually operable shutter mechanisms so that air from the side face outlets can be shut off at any time, the opening state of the side face ports 6b is maintained in all the outlet modes.

Figure 31:
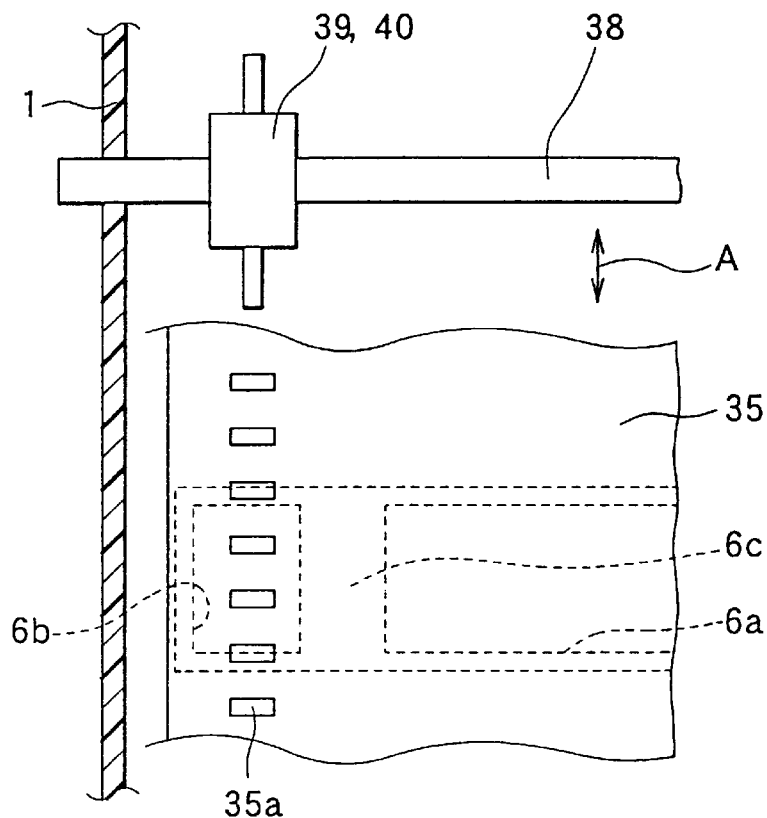
FIG. 31 is a view showing a main part of an air passage opening/closing device according to a fourteenth preferred embodiment of the present invention.

Focusing on the fact that the side face ports 6b may be open in all outlet modes, in other words, that there is no need for a fully sealed state to be provided for them, in the fourteenth preferred embodiment, the drive sprockets 39 and 40 are disposed at positions in the width direction of the film member 35 on extension lines of the side face ports 6b, and the sprocket holes 35a for the drive sprockets 39, 40 to mesh with are provided at positions in the film member 35 also on extension lines of the side face ports 6b, as shown in FIG. 31.

Figure 32:
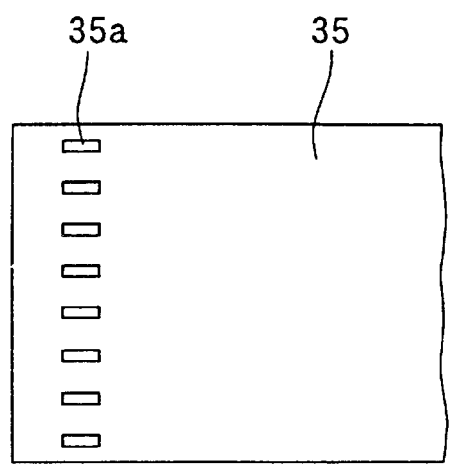
FIG. 32 is a front view of a film member for switching an air outlet mode, showing opening patterns, according to the fourteenth embodiment.

FIG. 32 shows an example of an opening pattern of the film member 35 in the fourteenth preferred embodiment. In the film member 35, the face port 6 (6a, 6b) and the defroster port 5 only are opened and closed by movement of the film member 35, and the foot port 7 is opened and closed by a separate door member.

In the defroster mode of the fourteenth preferred embodiment, the side face ports 6b are opened by the sprocket holes 35a, and air flows into the side face ports 6b through these sprocket holes 35a.

In the fourteenth preferred embodiment, it is possible either to reduce the size of the air-conditioning case 1 or to increase its capacity by increasing the opening areas of the outlet ports, similarly to the above-described thirteenth preferred embodiment. Furthermore, the width dimension of the side face ports 6b is larger than that of the dividing parts 6c. Therefore, the fourteenth preferred embodiment can be effectively used when it is necessary for the width dimensions of the drive sprockets 39 and 40 and the sprocket holes 35a to be set larger than the width of the dividing parts 6c.

(Modifications of Thirteenth and Fourteenth Preferred Embodiments)

In the above-described fourteenth embodiment, the drive sprockets 39 and 40 and the sprocket holes 35a are disposed in the width direction of the film member 35 on extension lines of the side face ports 6b. However, the drive sprockets 39 and 40 and the sprocket holes 35a may alternatively be disposed at positions on extension lines of the boundaries between the side face ports 6b and the dividing parts 6c, so that they extend into the width-direction ranges of both.

In a vehicle air conditioner where the defroster port 5 is disposed centrally in the width direction of the film member 35 and the side face ports 6b are disposed on the left and right sides of the defroster port 5, the drive sprockets 39 and 40 and the sprocket holes 35a may be disposed at positions on extension lines of dividing parts between the defroster port 5 and the left and right side face ports 6b.

(Fifteenth Preferred Embodiment)

Figure 33:
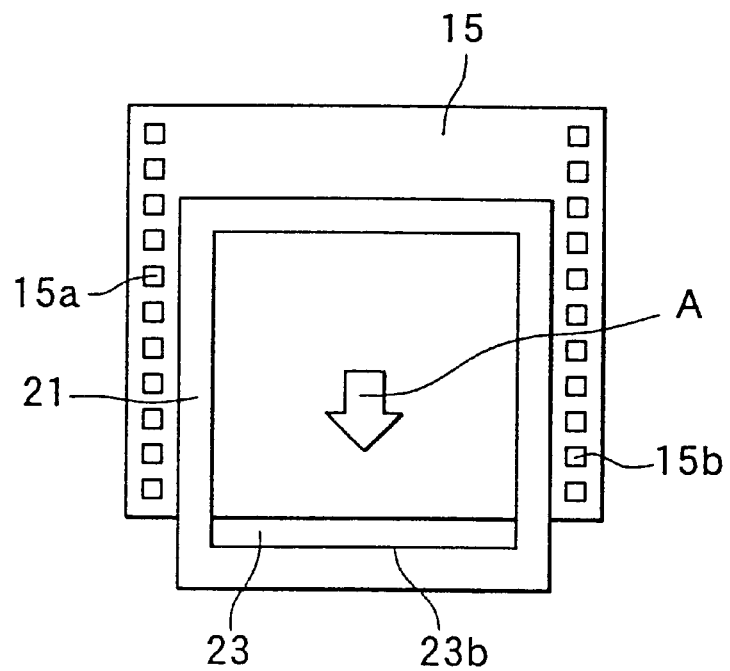
FIG. 33 is a view for explaining a problem to be solved in a fifteenth preferred embodiment of the present invention.

First, a problem to be solved in the fifteenth preferred embodiment will now be explained, with reference to FIG. 33 and FIG. 34. If the film member 15 is moved in the arrow A direction in FIGS. 33 and 34, when the airflow is above a medium flow (about 150 m³/hr), the airflow pressure acting on the film member 15 is high, and the film member 15 bends to the downstream side due to its own flexibility.

Figure 34:
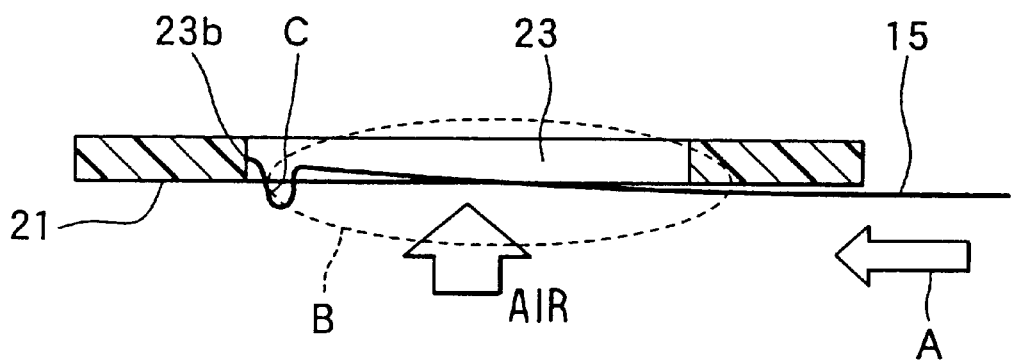
FIG. 34 is a view for explaining the problem to be solved in the fifteenth embodiment.

Consequently, as the film member 15 continues to move in the arrow A direction while the bending state of the film member 15 bent to the downstream side is maintained, it may happen that the leading free end of the film member 15 contacts the end surface 23b of the opening 23, as shown in FIG. 34, and the film member 15 may be damaged. The dashed line B in FIG. 34 shows a range of bending of the film member 15 to the downstream side, and the solid line C shows the bending (buckling) of the leading end of the film member 15.

To avoid this, the fifteenth preferred embodiment is provided for preventing buckling caused by bending of the film member to the downstream side.

Figure 35:
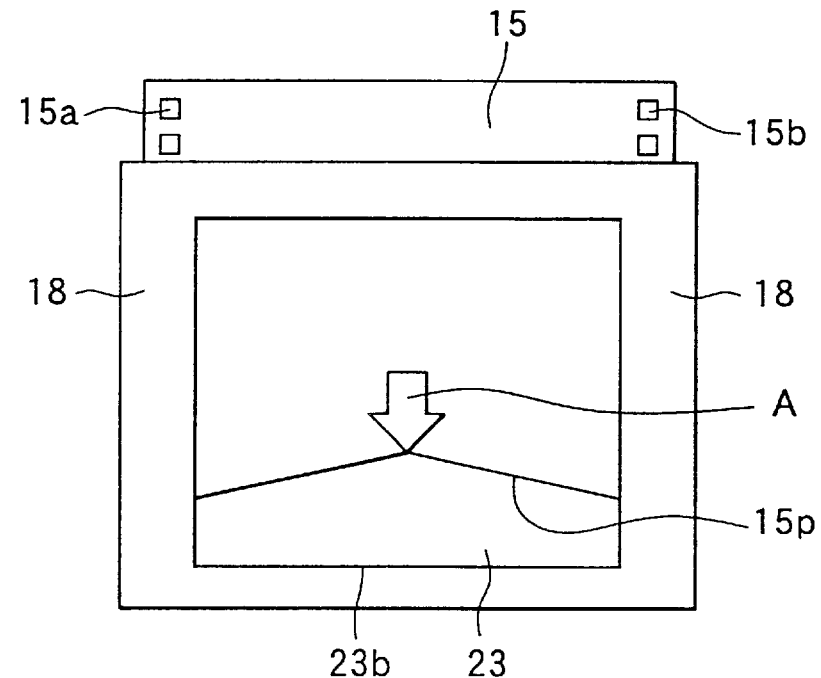
FIG. 35 is a front view showing an end shape of a film member of an air passage opening/closing device according to the fifteenth embodiment.
Figure 36:
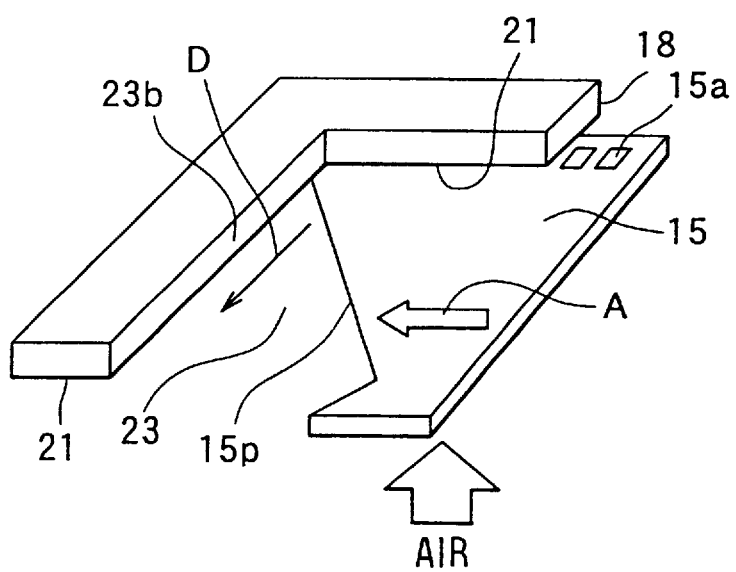
FIG. 36 is a perspective view showing the end shape of the film member according to the fifteenth embodiment.

FIG. 35 and FIG. 36 show main parts of the fifteenth preferred embodiment. The overall construction of the fifteenth preferred embodiment is similar to that shown in FIG. 1. In the fifteenth embodiment, a V-shaped cutaway 15p (recess) is formed in the reciprocation direction end (free end) of the film member 15.

When the film member 15 moves in the arrow A direction and passes over the opening 23, the side ends (i.e., the width direction ends) of the film member 15 (that is, the parts supported at all times by the guide members 17 and 18) reach the end surface 23b of the opening 23 first.

FIG. 36 shows at the reached state. Thereafter, when the film member 15 continues to advance in the arrow A direction, due to the V-shaped cutaway 15p, the end of the film member 15 reaches the position of the end surface 23b of the opening 23 progressively, from the side ends of the film member 15 to the center part. That is, the film member 15 arrives at the end surface 23b at points in the width direction which shift progressively from the side ends of the film member 15 toward the center part.

Consequently, even if the phenomenon of the film member 15 bending to the downstream side under airflow pressure as it passes over the opening 23 occurs, at the end surface 23b of the opening 23, the central part of the film member 15 is gradually corrected from a highly bent state to a less bent state. As a result, the film member 15 is prevented from abutting with the end surface 23b in a highly bent state starting with its central part, and buckling of the film member 15 is prevented.

(Sixteenth Preferred Embodiment)

In the above-described fifteenth preferred embodiment, only one V-shaped cutaway 15p is formed in the reciprocation direction end (free end) of the film member 15. However, in the following sixteenth preferred embodiment, a plurality of V-shaped cutaways 15p are formed in the free end of the film member 15, as shown in FIG. 37.

That is, in the sixteenth embodiment, one or more grid members 25 are provided in the opening 23 positioned on the downstream side of the film member 15, at positions in the width direction of the film member 15. The grid members 25 may be the same as the grid members 25 of the above-described fourth embodiment (FIGS. 6A and 6B). The grid members 25 are disposed to prevent bending of the film member 15 to the downstream side under airflow pressure by supporting intermediate parts of the film member 15 in the width direction.

Figure 37:
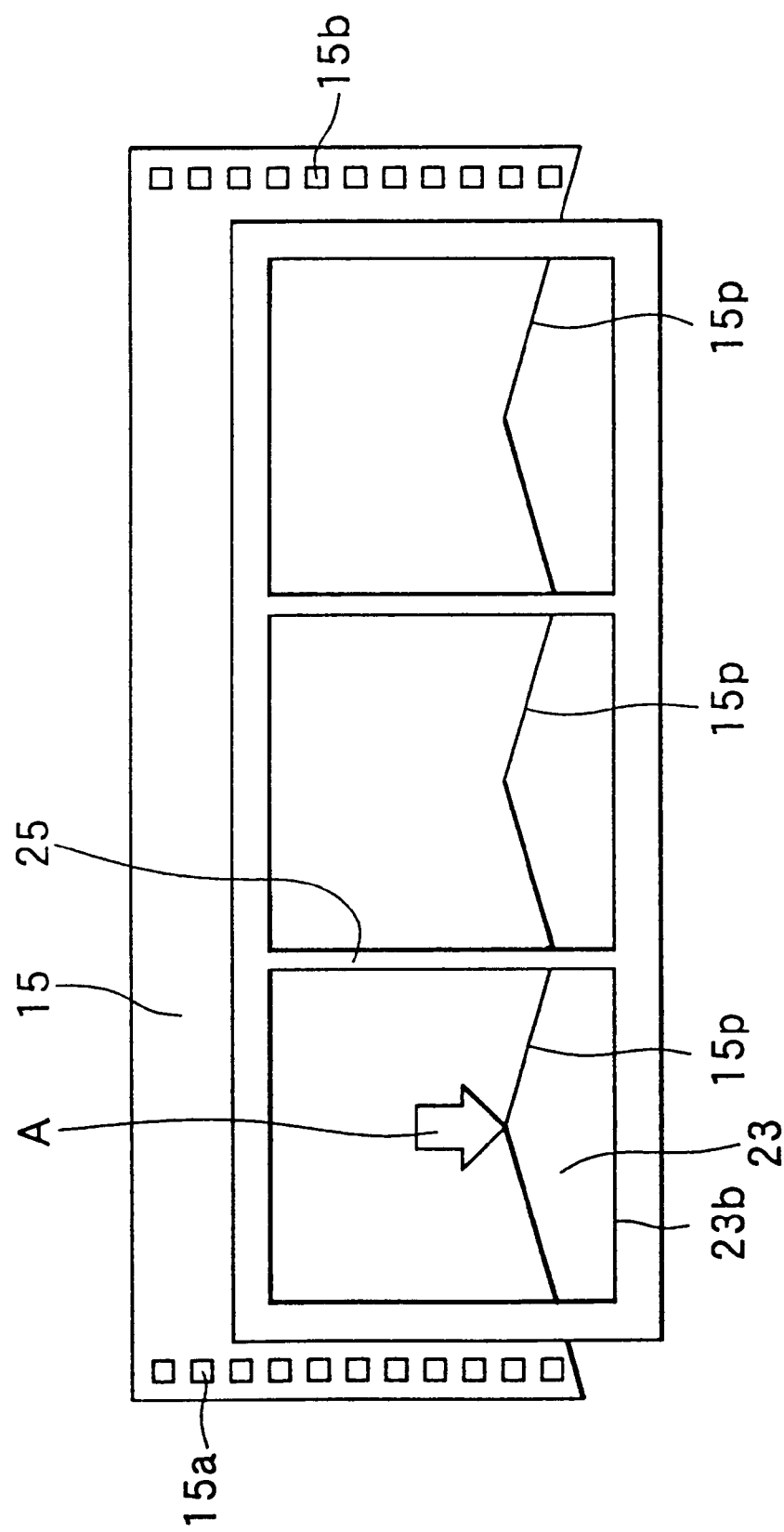
FIG. 37 is a front view showing an end shape of a film member of an air passage opening/closing device according to a sixteenth preferred embodiment of the present invention.

In the example of FIG. 37, because two grid members 25 are provided, three V-shaped cutaways 15p (recesses) are used. The points of the V-shaped cutaways 15p are positioned centrally between the two grid members 25 in the case of the middle V-shaped cutaway 15p and between one of the grid members 25 and an edge of the opening 23 in the case of the other two V-shaped cutaways 15p. Accordingly, buckling of the film member 15 can be prevented using the same mechanism as that of the above-described fifteenth embodiment.

(Seventeenth Preferred Embodiment)

Figure 38:
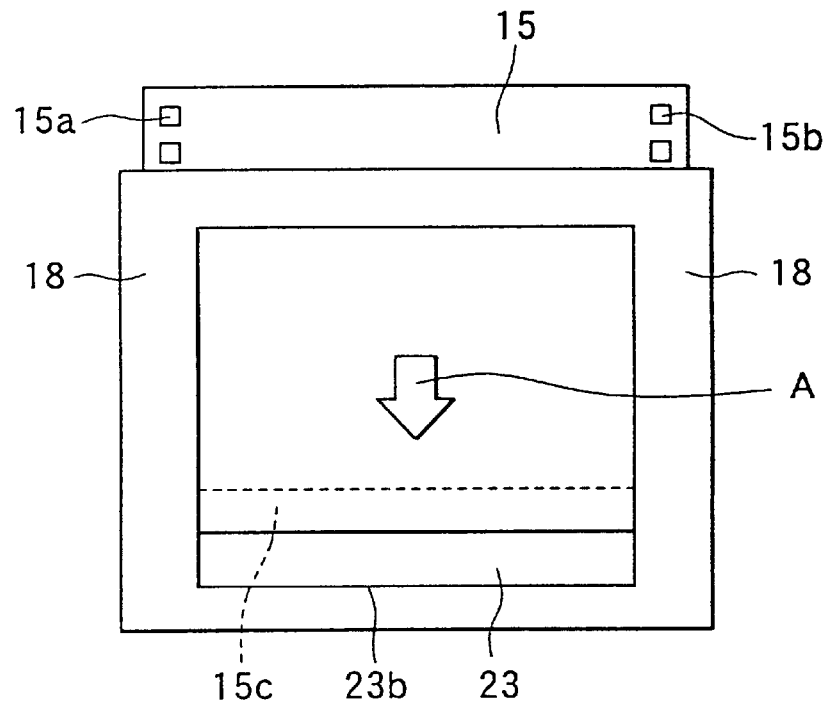
FIG. 38 is a front view showing a strengthening rib of an end portion of a film member according to a seventeenth preferred embodiment of the present invention.
Figure 39:
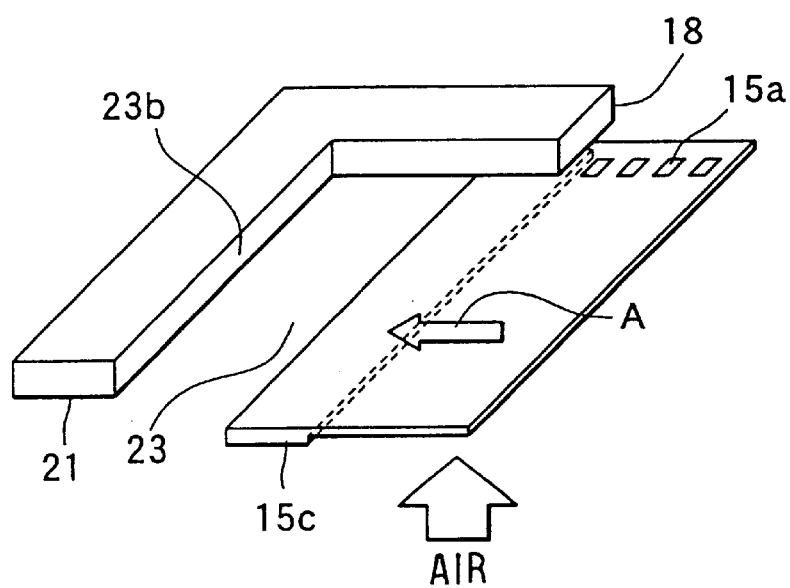
FIG. 39 is a perspective view showing the strengthening rib of the end portion of the film member according to the seventeenth embodiment.

In the following seventeenth preferred embodiment, a bucking-preventing structure is provided similarly to the above-described fifteenth and sixteenth embodiment. As shown in FIGS. 38 and 39, at least a strengthening rib 15c is provided at the end (free end) of the film member 15 in the reciprocation direction A. The strengthening rib 15c, like the strengthening ribs 15c in the second preferred embodiment, consists of a strip-shaped part thicker than the rest of the film member 15.

For obtaining sealing performance between the sealing wall 21 on the air-conditioning case 1 side and the film member 15, the strengthening rib 15c preferably projects in a strip like from the upstream side of the film member 15.

Because the strengthening rib 15c is provided in the film member 15, the end (free end) of the film member 15 is strengthened and the rigidity thereof is improved. Therefore, bending of the end of the film member 15 to the downstream side under the airflow pressure of blown air is effectively suppressed. Accordingly, it is possible to prevent the end of the film member 15 from abutting with the end surface 23b of the opening 23 and the film member 15 consequently buckling.

The strengthening, rib 15c can be molded integrally with the end of the film member 15. In addition, a separate strengthening rib 15c may be fixed by adhesive or the like to the end of the film member 15, a strengthening rib 15c may be formed by folding back the end of the film member 15, or a strengthening rib 15c may be molded on the end of the film member 15 by a two-color molding method.

(Eighteenth Preferred Embodiment)

In the foregoing fifteenth through seventeenth preferred embodiments, a case where the end of the film member 15 bends to the downstream:side under airflow pressure and abuts with the end surface 23b and buckles is described. In the following eighteenth embodiment, a buckling-preventing structure is provided for preventing the film member 15 from abutting with the end surface 23b and buckling due to bending to the upstream side under its own elastic restoring force.

Figure 40:
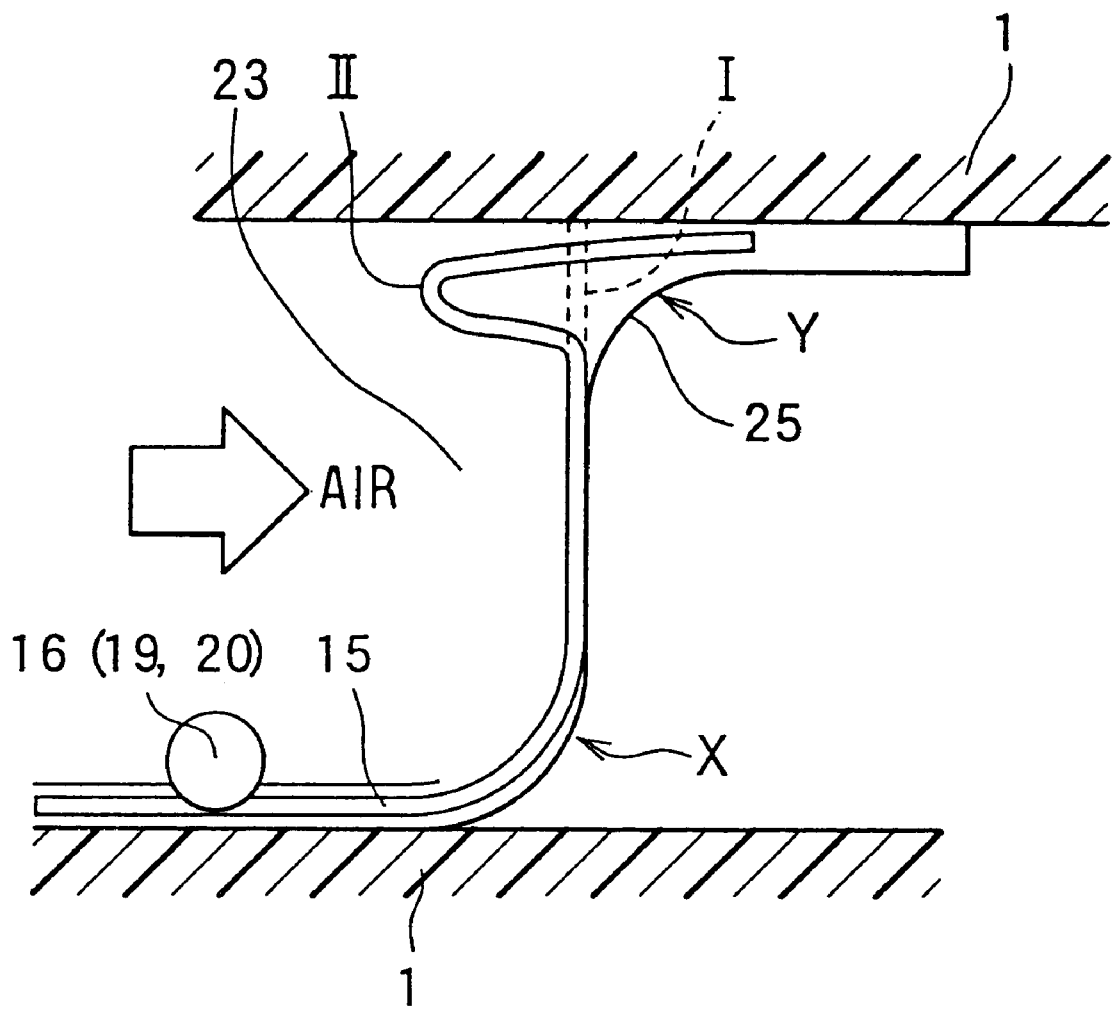
FIG. 40 is a view for explaining a problem to be solved in an eighteenth preferred embodiment of the present invention.

FIG. 40 is a schematic sectional view of a central part of a film member 15 in the width direction. A grid member 25 for bending-prevention is disposed on a downstream side of the width direction center of the film member 15, and bends X and Y at two locations are set as a route of advance of the film member 15. At the first bend X, the grid member 25 is positioned on the outer side (the downstream side) of the bend of the width direction center of the film member 15, and therefore, the bend outer side of the width direction center of the film member 15 is guided by the grid member 25.

At the next bend Y, on the other hand, because the grid member 25 is not positioned on the bend outer side (the upstream side) of the width direction center of the film member 15, there is no member regulating the bend outer side of the width direction center of the film member 15. The guide members 17 and 18 can regulate bending of the width direction ends (the side ends) of the film member 15, but do not properly regulate bending of its width direction center. Consequently, the width direction center of the film member 15 may advance in a straight line at the bend Y under its elastic restoring force, as shown with dashed lines I, abut with the wall of the air-conditioning case 1 (the end surface 23b of the opening 23), and buckle, as shown by II in FIG. 40.

Figure 41A:
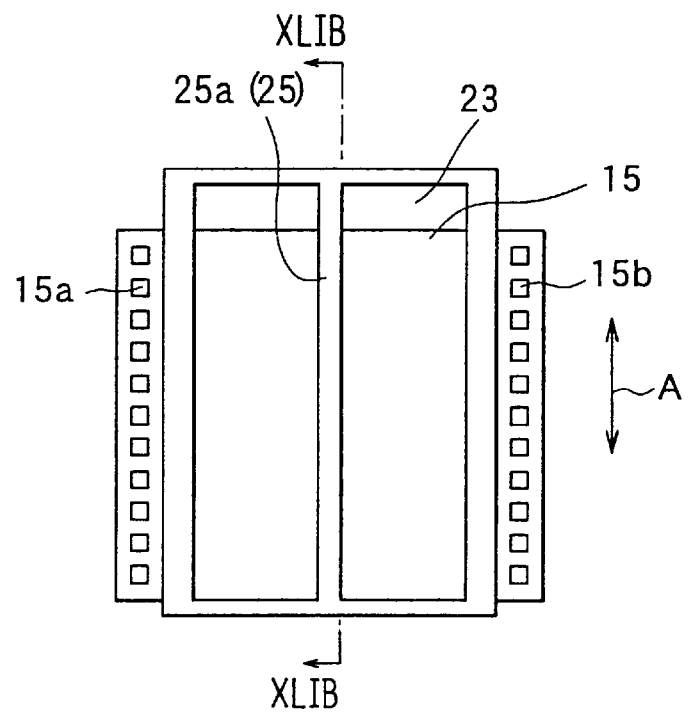
FIG. 41A is a front view showing a grid member for preventing a bending of a film member according to the eighteenth embodiment.
Figure 41B:
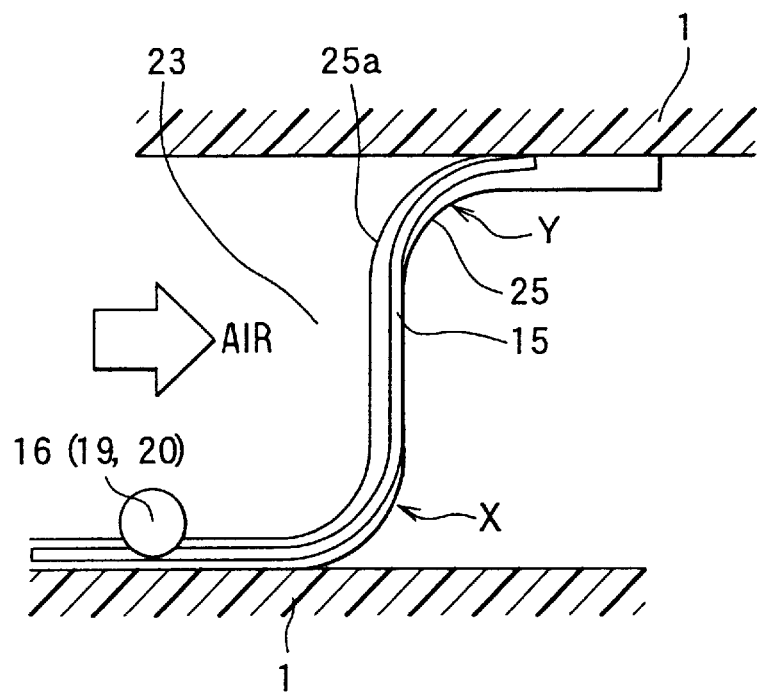
FIG. 41B is a cross-sectional view taken along line XLIB—XLIB in FIG. 41A.

To avoid this, in the eighteenth preferred embodiment, as shown in FIGS. 41A, 41B, while a grid member 25 for preventing bending due to airflow pressure is disposed on the downstream side of the film member 15 at the film member width direction center of the opening 23, a grid member 25a is also disposed on the upstream side at a position corresponding to the grid member 25. Accordingly, the width direction center of the film member 15 can be certainly prevented from buckling to the outer side (the upstream side) at the bend Y. Of course, alternatively, a plurality of the grid members 25 and 25a may be provided in the eighteenth embodiment. In the case, the plurality of grid members 25, 25a are preferably provided with a spacing of about 10 mm to 75 mm, and need not be provided with a uniform spacing.

Although the fifteenth through eighteenth preferred embodiments are described using the example of the air-mixing film member 15, these preferred embodiments can also be applied to the mode switching film member 35.

(Nineteenth Preferred Embodiment)

According to experimental studies carried out by the present inventors, when the teeth of a drive sprocket 19, 20, 39 and 40 removes from the sprocket holes 15a, 15b and 35a of a film member 15 and 35, an extraneous noise (a clipping sound) is caused by catching between the drive sprocket and the sprocket holes. The object of the nineteenth preferred embodiment is to suppress the extraneous noise.

Figure 42:
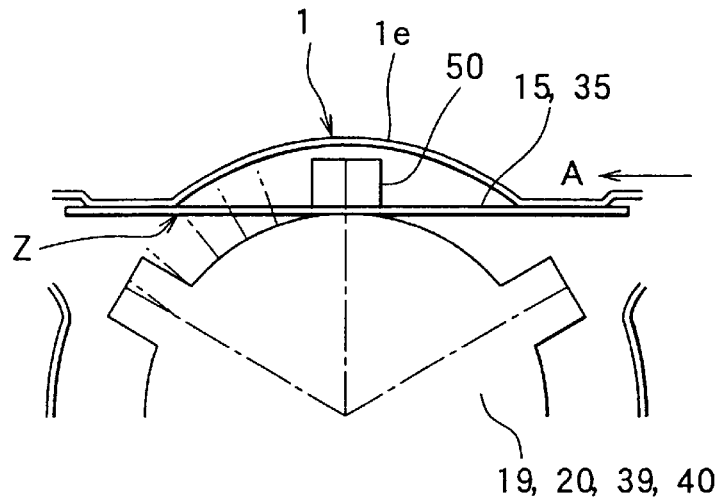
FIG. 42 is a view for explaining a problem to be solved in a nineteenth preferred embodiment of the present invention.

First, the cause of the extraneous noise will be explained. FIG. 42 shows a comparison example studied by the present inventors, in which the drive sprocket 19, 20, 39, 40 has simple cylindrical teeth 50. The broken lines in FIG. 42 show the rotational locus of the meshing plane 52 of a tooth 50 in increments of 10°.

Figure 43:
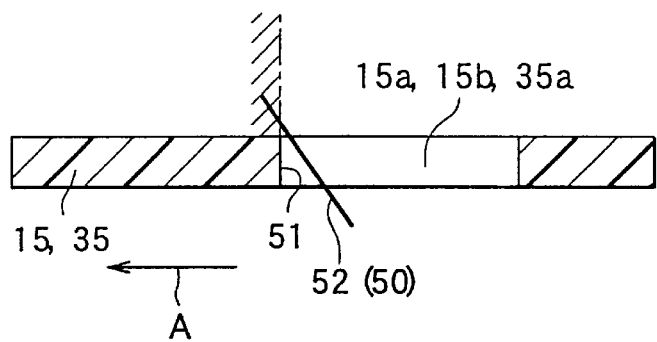
FIG. 43 is a view for explaining the problem to be solved in the nineteenth embodiment.

In the cylindrical tooth 50, the tooth has the same diameter from the tooth bottom to the tooth tip. Therefore, when the tooth 50 removes from the sprocket hole 15a, 15b and 35a of the film member 15 and 35 at a rotational position Z in FIG. 42, the tooth tip at the meshing plane 52 of the cylindrical tooth 50 projects forward beyond the advancing direction end surface 51 (i.e. the meshing surface of the film member) of the sprocket hole 15a, 15b, 35a, as shown in FIG. 43. As a result, the meshing plane 52 of the tooth 50 catches on the advancing direction end surface 51 of the film member 15, 35 and an extraneous noise is produced.

Figure 44:
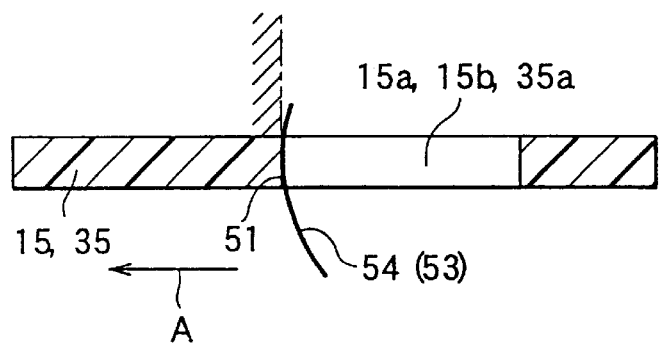
FIG. 44 is a view for explaining operation of a driving gear of an air passage opening/closing device according to the nineteenth embodiment.

To overcome this, in the nineteenth preferred embodiment, the drive sprocket 19, 20, 39, 40 is so formed that, as illustrated in FIG. 44, the meshing surface 54 of each tooth 53 of the drive sprocket 19, 20, 39, 40 is always behind the sprocket hole end surface 51 in film member advance direction A.

Figure 45:
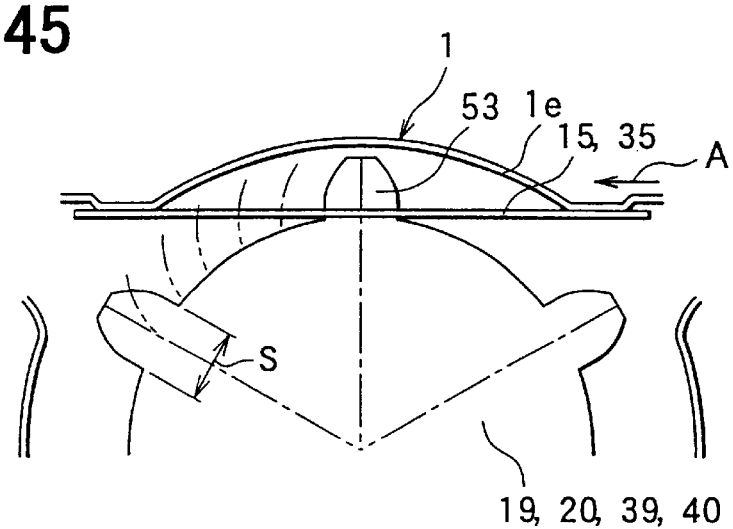
FIG. 45 is an enlarged view showing a driving gear of an air passage opening/closing device according to the nineteenth embodiment.

FIG. 45 shows a specific example of a drive sprocket 19, 20, 39 or 40 satisfying the meshing condition illustrated in FIG. 44. The teeth 53 of the drive sprocket 19, 20, 39 and 40 of FIG. 45 are involute teeth having involute curves.

Figure 46:
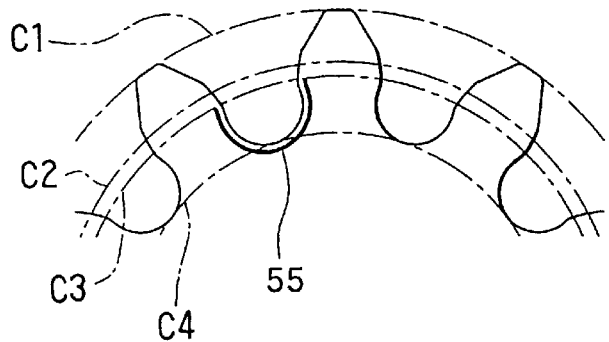
FIG. 46 is a view for explaining an involute gear used in the nineteenth embodiment.

Now, in general involute gears according to JIS standards, because they are primarily aimed at smooth meshing between the teeth of two gears, a scooped part 55 constituting clearance for another gear to move through is formed at the tooth bottom, as shown in FIG. 46. In the general involute gears shown in FIG. 46, C1 is a tooth top circle, C2 is a pitch circle, C3 is a base circle, and C4 is tooth bottom circle.

However, in the present invention, the meshing is not between the teeth of two gears but rather between the teeth 53 of a drive sprocket and sprocket holes 15a, 15b and 35a formed perpendicular to the surfaces of the film member 15, 35. And it has been found that in this case, when scooped parts 55 are provided between the teeth 53 of the drive sprocket, the scooped parts 55 catch on the sprocket hole end surfaces 51 and generates extraneous noise.

Therefore, in the drive sprocket 19, 20, 39, 40 of the nineteenth preferred embodiment, as shown in FIG. 45, the tooth shape does not have a scooped part 55. More specifically, the tooth shape of FIG. 45 is obtained by forming 8 involute teeth 53 of JIS standard B1701 pressure angle 20° radial outside of a pitch circle C2 (see FIG. 46) of diameter 18 mm. Accordingly, the teeth 53 have a shape such that their width S in the rotation direction gradually decreases with progress from the tooth bottom toward the tooth tip, as shown in FIG. 45. The pitch circle C2 is a circle having as its circumference a length obtained by multiplying by the number of teeth a reference pitch constituting a standard of the size of, the teeth of the gear.

With the involute teeth 53 shown in FIG. 45, the meshing surface 54 of the tooth 53 of the drive sprocket is always positioned behind the sprocket hole end surface 51 in the advancing direction A of the film member (see FIG. 44). Therefore, when the tooth of the drive sprocket 19, 20, 39 and 40 comes out of the sprocket hole 15a, 15b, 35a of the film member 15, 35, the meshing surface 54 of the tooth 53 does not catch on the end surface 51 of the sprocket hole, and the meshing surface 54 of the tooth 53 passes smoothly along the end surface 51. Accordingly, the generation of extraneous noise caused by catching of the drive sprocket teeth 53 is suppressed.

In the foregoing explanation, the drive sprocket teeth 53 are formed radially outside of the pitch circle; however, the drive sprocket teeth 53 may alternatively be formed radially outside of the base circle (see FIG. 46). Here, the base circle means the circle forming the base on which the involute teeth are made.

(Twentieth Preferred Embodiment)

Figure 47:
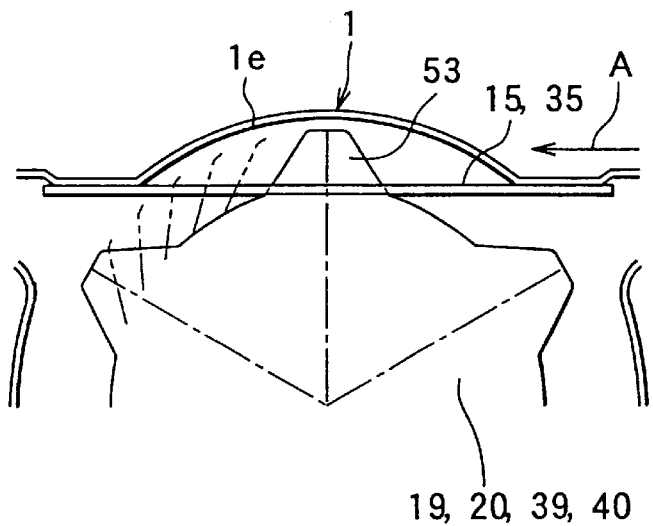
FIG. 47 is an enlarged view showing a driving gear of an air passage opening/closing device according to a twentieth preferred embodiment of the present invention.

In the above-described nineteenth embodiment, the drive sprocket teeth 53 are made involute teeth having a shape (without a scooped part 55) such that the width S gradually decreases with progress from the tooth bottom toward the tooth tip. In the twentieth preferred embodiment, as shown in FIG. 47 the drive sprocket teeth 53 are made with a trapezoidal tooth profile.

(Twenty-first Preferred Embodiment)

Figure 48:
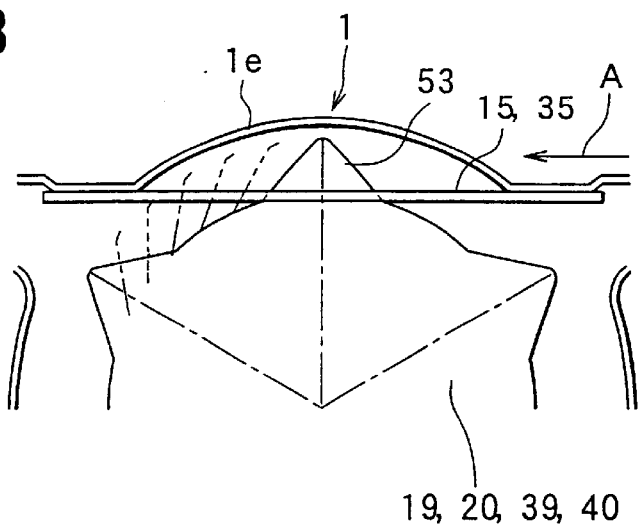
FIG. 48 is an enlarged view showing a driving gear of an air passage opening/closing device according to a twenty-first preferred embodiment of the present invention.

In the twenty-first preferred embodiment, as shown in FIG. 48, the drive sprocket teeth 53 are made with a triangular tooth profile.

Even in the tooth profiles of the twentieth and twenty-first preferred embodiments, the condition that the meshing surface 54 of the drive sprocket tooth 53 is always positioned behind the sprocket hole end surface 51 of the film member is satisfied. Therefore, similarly to the effect in the nineteenth preferred embodiment, it is possible to suppress the extraneous noise caused by catching of the drive sprocket teeth 53. The drive sprocket teeth 53 do not have to be involute teeth and may alternatively be made cycloid teeth.

(Twenty-second Preferred Embodiment)

In the above-described nineteenth embodiment, the drive sprocket teeth 53 are made involute teeth without scooped parts 55. However, the following twenty-second preferred embodiment relates to a case where the drive sprocket teeth 53 are made using ordinary involute teeth having scooped parts 55 according to for example JIS standards.

Figure 49:
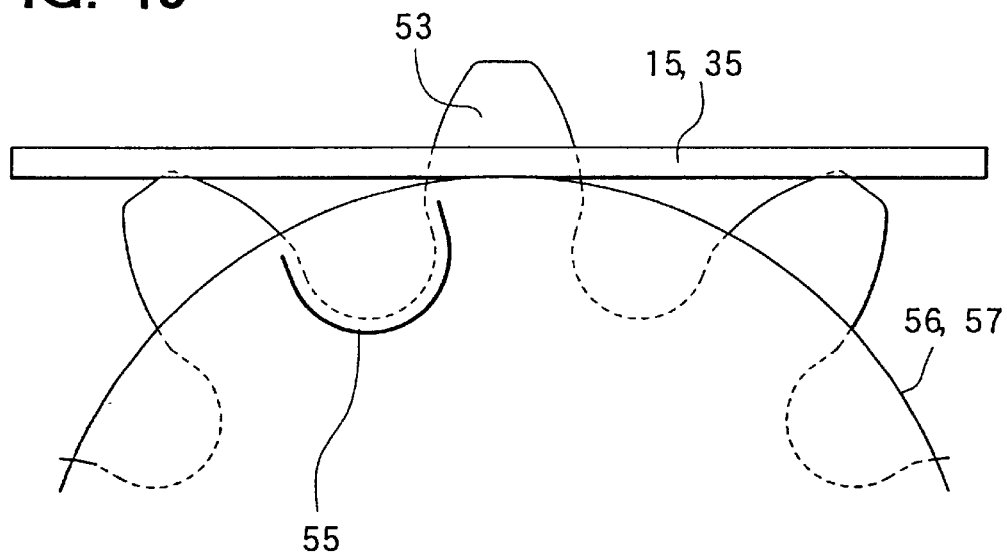
FIG. 49 is an enlarged view showing sprocket teeth of a driving gear of an air passage opening/closing device according to a twenty-second preferred embodiment of the present invention.
Figure 50:
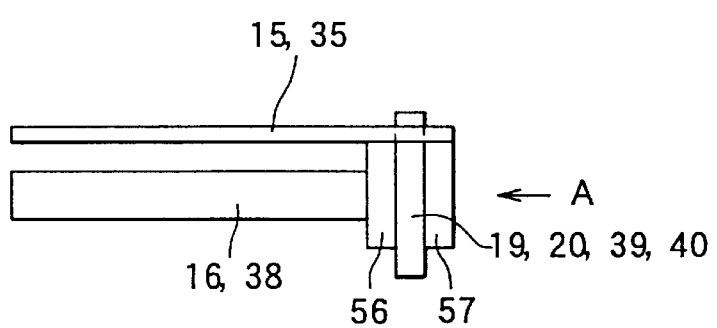
FIG. 50 is an enlarged view of a driving gear mechanism according to the twenty-second embodiment.

In the twenty-second preferred embodiment, as shown in FIGS. 49 and 50, cylindrical support surfaces 56 and 57 for supporting the film member 15, 35 are formed integrally with the drive sprocket 19, 20, 39, 40 on both sides of the drive sprocket 19, 20, 39, 40. The diameter of these cylindrical support surfaces 56, 57 is made equal to or larger than that of the base circle or the pitch circle mentioned above. Consequently, even when there are scooped parts 55 between the involute teeth 53 of the drive sprocket 19, 20, 39, 40, the film member 15, 35 is supported and kept radially outside the scooped parts 55 by the cylindrical support surfaces 56 and 57. As a result, the scooped parts 55 are made essentially ineffective and the same effects as those of the nineteenth preferred embodiment can be obtained.

(Twenty-third Preferred Embodiment)

In the above-described first preferred embodiment, a receiving space 24 for receiving the film member 15 is formed only at one end in the reciprocation direction (advancing direction) A of the film member 15, (at the top of the air-conditioning case 1), as shown in FIG. 1. In the twenty-third preferred embodiment, both receiving spaces 24 and 24a for receiving the film member 15 are formed at both ends of the film member 15 (at both the top and the bottom of the air-conditioning case 1), as shown in FIG. 51A.

Figure 51A:
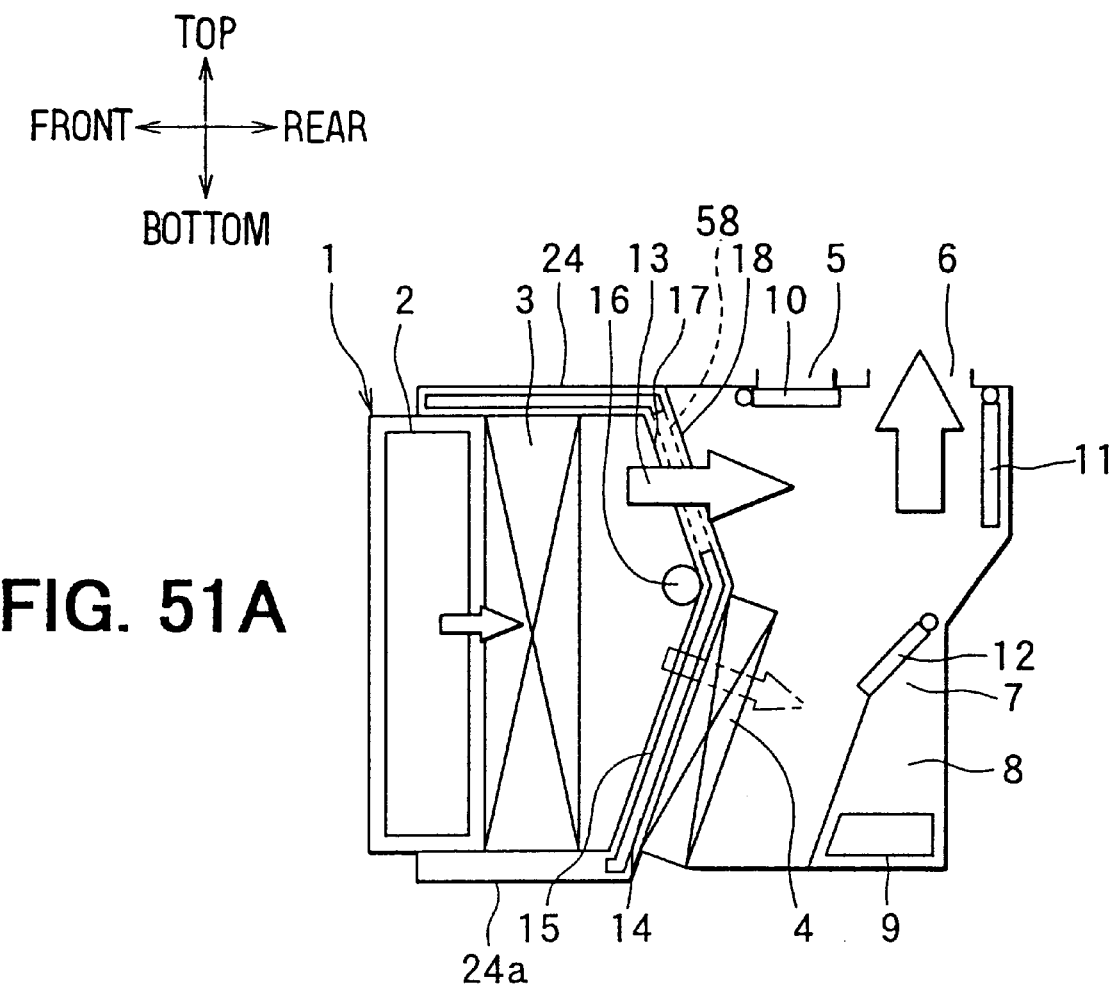
FIG. 51A is a schematic sectional view showing a vehicle air conditioner according to a twenty-third preferred embodiment of the present invention.
Figure 51B:
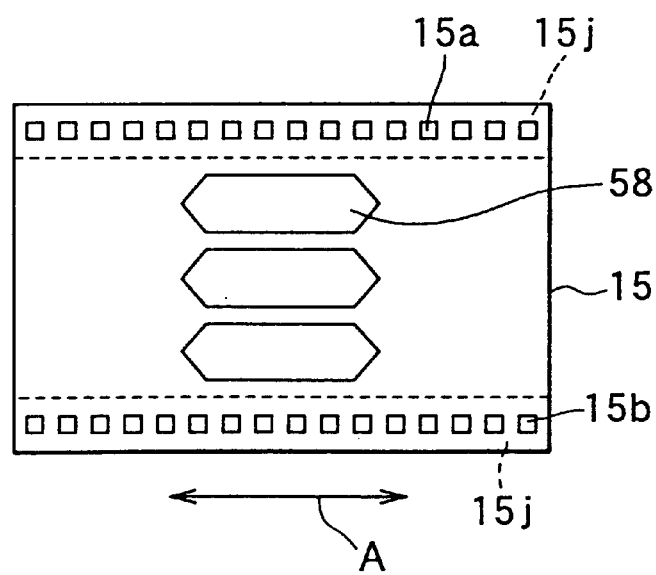
FIG. 51B is a top view of a film member according to the twenty-third embodiment.

The air-mixing film member 15 used in the twenty-third preferred embodiment has openings 58 provided centrally in the reciprocation direction A (the advancing direction), as shown in FIG. 51B. In this example, three openings 58 are provided in a line in the width direction of the air-mixing film member 15.

According to the twenty-third preferred embodiment, when the openings 58 of the film member 15 move to a position where they completely overlap the cool air bypass passage 13, as shown in FIG. 51A, the maximum cooling is set in the vehicle air conditioner. When the openings 58 of the film member 15 move to a position where they completely overlap the airflow passage 14 of the heater core 4, the maximum heating is set in the vehicle air-conditioner. Further, when the openings 58 of the film member 15 move to an intermediate position between the cool air bypass passage 13 and the airflow passage 14, an intermediate temperature control is set in the vehicle air conditioner.

Consequently, the free ends (both ends) of the film member 15 in the reciprocating direction A can be positioned in the upper and lower receiving spaces 24, 24a at all times. In the twenty-third embodiment, because the free ends of the film member 15 in the reciprocating direction A are never positioned in the cool air bypass passage 13 or the airflow passage 14, the free ends of the film member 15 are prevented from being caused to vibrate by the air flow. As a result, extraneous noise originating in vibration of the free ends can be prevented.

(Twenty-fourth Preferred Embodiment)

The following twenty-fourth preferred embodiment mainly relates to initialization of the driving member of the film member 15.

When a stepping motor is used as the motor (drive source) for driving the film member 15, because the rotation of the stepping motor is regulated exclusively by the step count of an input pulse, it is not necessary for the position of the film member 15 to be detected by a position detecting unit such as a potentiometer and for the rotation of the motor to be feedback-controlled. Thus, there is the merit that the construction of the film member driving mechanism can be simplified by dispensing with such position detecting unit.

On the other hand, however, to move a film member to a predetermined position using a stepping motor as the driving member of the film member 15 based on an input pulse step count, it is necessary for the film member position (the motor rotational position) at which the step count of the input pulse is zero to be preset to a specified position. That is, it is necessary for the position of the stepping motor (the film member) to be initialized.

Figure 52A:
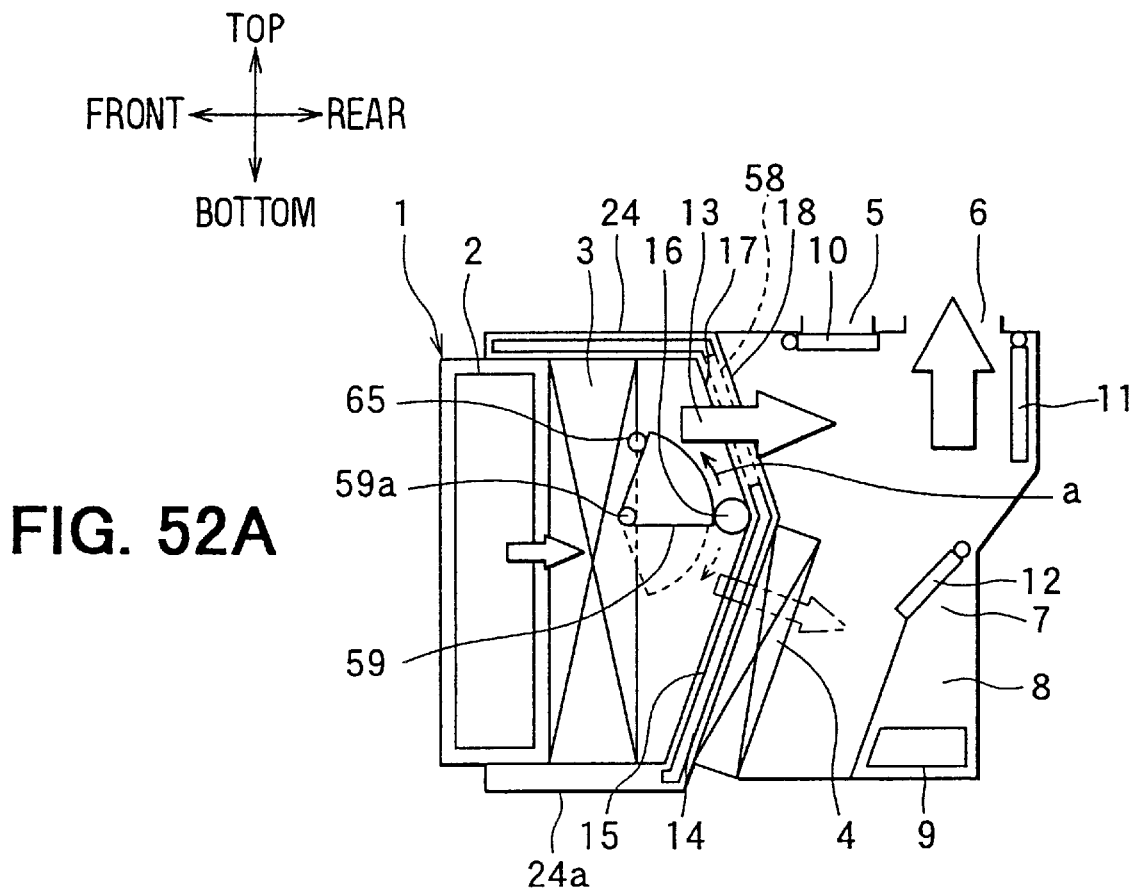
FIG. 52A is a schematic sectional view showing a vehicle air conditioner according to a twenty-fourth preferred embodiment of the present invention.

Accordingly, in the twenty-fourth preferred embodiment, as means for driving a film member 15 having free ends, a drive source which requires initialization of its operating position, like a stepping motor, is used. FIG. 52A shows a vehicle air conditioner according to the twenty-fourth preferred embodiment. A sector-shaped drive gear (linking member) 59 engages with a gear part (not shown) of the driving shaft 16, and a rotation shaft 59a of the drive gear 59 is rotatably supported in the air-conditioning case 1. Also, an output shaft 60a of a stepping motor 60 is connected to the driving shaft 16.

Accordingly, rotation of the stepping motor 60 is transmitted to the driving shaft 16. Therefore, the film member 15 moves forward or backward by the rotation of the driving shaft 16, and the sector-shaped drive gear 59 rotates in linkage with the rotation of the stepping motor 60.

Figure 52B:
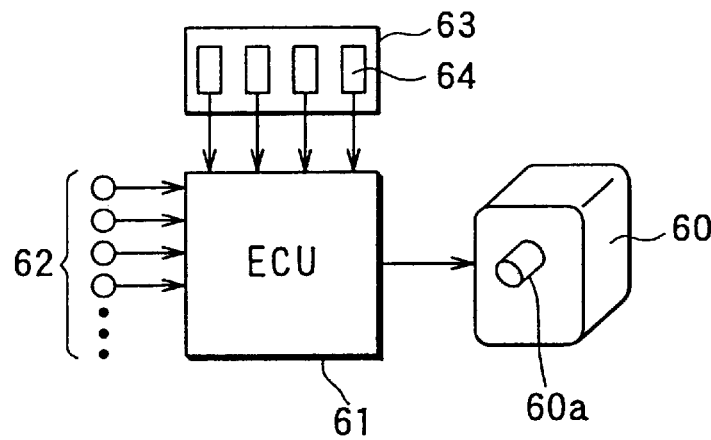
FIG. 52B is a block diagram of a control unit according to the twenty-fourth embodiment.

FIG. 52B is a schematic block diagram of a control system of the stepping motor 60. The stepping motor 60 is controlled by an air-conditioning electronic control unit (ECU) 61. The air-conditioning ECU 61 is made up of for example a microcomputer and peripheral circuits thereof, and controls electrical devices of the vehicle air conditioner by executing predetermined computational processing in accordance with a preset program.

In the twenty-fourth preferred embodiment, a step count of an input pulse to the stepping motor 60 is determined on the basis of an air-mixing opening-degree signal computed by the microcomputer of the air-conditioning ECU 61 or an outlet temperature control signal set manually by a vehicle occupant, and a rotation amount (rotation angle) and a rotation direction of the stepping motor 60 are determined by this step count.

Signals from a sensor group 62 sensing environmental factors which affect air-conditioning of the passenger compartment, such as an inside air temperature, an outside air temperature and an amount of solar radiation entering the passenger compartment, and signals from a switch group 64 on an air-conditioning control panel 63, are inputted to the air-conditioning ECU 61.

Also, a gear stopper 65 for stopping one side of the sector-shaped drive gear 59 at a predetermined position is provided in the air-conditioning case 1. The gear stopper 65 can be molded integrally with the air-conditioning case 1. The specific position of the gear stopper 65, in this example, is a position slightly past the maximum cooling position of the film member 15 and a position such that the end (free end) of the film member 15 does not abut with the inner wall surface of the air-conditioning case in the receiving space 24.

Therefore, when the film member 15 has passed its maximum cooling position slightly but before the end (free end) of the film member 15 contacts the inner wall surface of air-conditioning case 1, the sector-shaped drive gear 59 abuts with the gear stopper 65 as shown in FIG. 52A and rotation of the drive gear 59, and hence movement of the film member 15, is stopped.

Accordingly, it is possible to carry out initialization of the stepping motor 60 of the film member 15 by the sector-shaped drive gear 59 and the gear stopper 65. Thus, the stepping motor 60 can be initialized without any force for initialization being applied to the film member 15.

A specific example of a procedure for setting the initial position (initializing) of the stepping motor 60 (and hence the film member 15) will now be described. Initialization of the position of the stepping motor 60 (the film member 15) is necessary at times such as when the air-conditioning ECU 61 is first connected to the vehicle battery (not shown). For example, the air-conditioning ECU 61 and the battery are reconnected, when after the vehicle air-conditioning unit is installed in the vehicle and when after the electrical connection between the air-conditioning ECU 61 and the battery has been cut for replacement or testing of the battery.

In the air-conditioning ECU 61, when it is determined, on the basis of a signal indicating electrical connection with the vehicle battery or an ON signal of a vehicle engine ignition switch, that a required condition (such as that the ignition switch has been turned on for the first time after the air-conditioning ECU 61 is connected to the battery) for setting of the initial position of the stepping motor 60 (and the film member 15) is established, the air-conditioning ECU 61 powers the stepping motor 60 for a predetermined time and the sector-shaped drive gear 59 is thereby driven to rotate for a predetermined time in the arrow "a" direction of FIG. 52A. Accordingly, in this 15 case, the drive gear 59 contacts the gear stopper 65.

Thus, the initial position of the stepping motor 60 (and the film member 15) can be set automatically, and this state of abutment between the drive gear 59 and the gear stopper 65 is made the input pulse step count=0 position of the stepping motor 60.

In the twenty-fourth preferred embodiment, the initialization in a case where a stepping motor 60 is used as the driving member of the film member 15 is described. However, the twenty-fourth preferred embodiment can also be applied to other driving unit requiring initialization similarly to the stepping motor 60.

Although the present invention has been fully described in connection with the preferred embodiments thereof with reference to the accompanying drawings, it is to be noted that various changes and modifications will become apparent to those skilled in the art.

For example, in the foregoing preferred embodiments the film member 15 is molded integrally. However, a plurality of separately molded component parts may be joined together to form a complete film member 15. The strengthening ribs 15c also are not limited to the shape shown in FIGS. 4A through 4c and may be of a different shape.

The film member 15 may alternatively be made to move by a driving member (such as a link lever) being connected to one end in the reciprocation direction A of the film member 15 through a linking member such as a wire. In this case, a driving force (a pulling force or a pushing force) is transmitted to the end of the film member 15 at all times via the driving member and the linking member.

The film member 15 may be made magnetic and directly made to reciprocate by a linear motor. Or, conversely, instead of using a motor as driving means, a manual operating force may be transmitted to the film member 15 to move the film member 15.

In the foregoing preferred embodiments, at least one end of the film member 15 in the reciprocating direction A is formed to advance toward the receiving space 24 in a straight line and at least the end of the film member 15 is thus received into the receiving space 24 in a film-extending state. However, one end of the film member 15 in the reciprocating direction A may be wound in a spiral inside the receiving space 24.

Although in the foregoing preferred embodiments, the present invention is applied to an air-mixing film member 15 and a mode switching film member 35 of a vehicle air conditioner. However, the present invention can also be applied, for example, to a film member for switching between inside and outside air in a vehicle air conditioner. Also, the present invention is not limited to a vehicle air conditioner and can be applied widely to an air-passage switch in various fields.

Such changes and modifications are to be understood as being included within the scope of the present invention as defined in the appended claims.

What is claimed is:

1. An air passage opening/closing device comprising:
    an air duct for defining an air passage through which air flows;
    a film member having a predetermined flexible performance, the film member being disposed to reciprocate in the air passage for opening and closing the air passage;
    a heat exchanger, disposed in the air duct, for performing a heat exchange with air in the air passage;
    a driving member which applies driving force for a reciprocating movement of the film member to at least one position of the film member; and
    a guide member which guides the film member for the reciprocating movement of the film member,
    wherein the film member has a rigidity equal to or larger than a predetermined degree, so that the film member moves along the guide member when a pushing force pushing the film member is applied to the film member from the driving member;
    the air duct has a receiving space into which a part of the film member, including one end of the film member in a reciprocating direction of the film member, is received; and
    the receiving space is provided between the air duct and a side wall of the heat exchanger, the side wall being a part of a peripheral wall portion of the heat exchanger defining an air passage within the heat exchanger.

2. The air passage opening/closing device according to claim 1, wherein:
    the air duct has a peripheral member defining an opening communicating the air passage;
    the film member contacts a seal surface of the peripheral member by pressure of air flowing into the air passage to close the air opening; and
    the film member has a strengthening portion extending in a direction perpendicular to a reciprocating direction of the film member.

3. The air passage opening/closing device according to claim 1, wherein:
    the air duct has a peripheral member defining an opening communicating the air passage;
    the film member contacts a seal surface of the peripheral member by pressure of air flowing into the air passage to close the air opening; and
    the film member has a strengthening portion extending in a direction parallel to a reciprocating direction of the film member.

4. The air passage opening/closing device according to claim 3, wherein:
    the strengthening portion is a strengthening rib protruding from a film surface of the film member; and
    the peripheral member has a recess at a side of the seal surface, into which the strengthening rib is inserted to engage with the strengthening rib.

5. The air passage opening/closing device according to claim 1, further comprising
    a grid member which is disposed in the air passage at a downstream air side of the film member to restrict deformation of the film member due to air pressure.

6. The air passage opening/closing device according to claim 1, wherein:
    the air duct has a peripheral member defining an opening communicating the air passage;
    the film member has a film stopper member at an end in a reciprocating direction;
    the peripheral member has an peripheral stopper member protruding to the opening of the air passage; and
    the peripheral stopper member engages with the film stopper member at a predetermined movement position of the film member.

7. The air passage opening/closing device according to claim 1, wherein:
    the film member has a driving force transmitting portion to which the driving force from the driving member is applied; and
    the driving force transmitting portion has a rigidity larger than that of the other portion in the film member.

8. The air passage opening/closing device according to claim 1, wherein:
    the air duct has a support member in the receiving space; and
    the support member partially supports a film surface of the film member on a downstream air side.

9. The air passage opening/closing device according to claim 8, wherein the support member is provided to support both end sides of the film member in a direction perpendicular the reciprocating direction.

10. The air passage opening/closing device according to claim 8, wherein the film member is moved into the receiving space to form both opposite clearances on both upstream and downstream sides of the film member at a position behind the support member in the receiving space.

11. The air passage opening/closing device according to claim 1, wherein:
    the air duct has a receiving space into which one end of the film member in a reciprocating direction of the film member is received;
    the air duct has a support member in the receiving space;

the support member partially supports a film surface of the film member on a downstream air side;

the air duct further has a peripheral portion defining an opening communicating with the air passage;

the peripheral portion has a protrusion around the opening; and the protrusion is provided to face the film surface of the film member on the downstream air side.

12. The air passage opening/closing device according to claim 1, wherein:

the driving member includes a driving shaft and a driving gear driven by the driving shaft;

the film member is disposed to be reciprocated by the rotation of the driving gear; and the driving gear is disposed at a downstream air side of the film member.

13. The air passage opening/closing device according to claim 12, wherein:

the driving gear is disposed at a lower side of the film member.

14. The air passage opening/closing device according to claim 12, wherein the driving gear is disposed at an upper side of the film member, the device further comprising:

a pressing member for pressing the film member onto the driving gear.

15. The air passage opening/closing device according to claim 12, further comprising:

a blower for blowing air into the air passage; and the film member is disposed to be reciprocated only when the blower operates.

16. The air passage opening/closing device according to claim 1, wherein:

the driving member includes a driving shaft and a driving gear driven by the driving shaft; and the film member is disposed to be reciprocated by the rotation of the driving gear, the device further comprising:

a pressing member pressing the film member onto the driving gear, the pressing member being disposed in the air duct.

17. The air passage opening/closing device according to claim 16, wherein the pressing member is formed integrally with the air duct at a radial outside from the driving gear.

18. The air passage opening/closing device according to claim 16, wherein the pressing member is formed separately from the air duct at a radial inside from the driving gear.

19. The air passage opening/closing device according to claim 1, wherein:

at least one end of the film member in a reciprocating direction has a supported part supported by the guide member, and a non-supported part except for the supported part; and the non-supported part is recessed from the supported part.

20. The air passage opening/closing device according to claim 1, wherein:

the film member has a strengthening portion at one end in a reciprocating direction; and in the film member, the strengthening portion has a rigidity higher than that of the other portion.

21. The air passage opening/closing device according to claim 1, wherein:

the driving member includes a driving shaft and a driving gear rotated by the driving shaft;

the film member has engagement holes which engage with teeth of the driving gear so that the film member is reciprocated by the rotation of the driving gear; and an engagement surface of each tooth of the driving gear is always behind an end surface of the engagement hole in a advance direction of the film member.

22. The air passage opening/closing device according to claim 21, wherein the teeth of the driving gear are involute teeth having involute curves.

23. The air passage opening/closing device according to claim 1, wherein:

the driving member includes a driving shaft and a driving gear rotated by the driving shaft;

the film member has engagement holes which engage with teeth of the driving gear so that the film member is reciprocated by the rotation of the driving gear; and the driving gear is formed so that each tooth width is gradually reduced from a tooth bottom toward a tooth top.

24. The air passage opening/closing device according to claim 23, wherein the teeth of the driving gear are involute teeth having involute curves.

25. The air passage opening/closing device according to claim 1, wherein the film member has a bent portion bent in the air passage, the device further comprising:

a grid member disposed along a bending shape of the bent portion at an outside of the bent portion of the film member.

26. The air passage opening/closing device according to claim 1, further comprising:

a grid member disposed at an upstream air side of the film member.

27. The air passage opening/closing device according to claim 1, wherein:

the driving member includes a driving source which generates a driving force for reciprocating the film member, a connection member operatively linked with a movement of the driving source, and a stopper member which regulates a position of the connection member at a predetermined position so that an initial position of the driving source is set.

28. The air passage opening/closing device according to claim 1, wherein:

the air duct has a peripheral portion defining an opening communicating the air passage;

the film member contacts a seal surface of the peripheral member by pressure of air flowing into the air passage to close the air opening; and the film member has a low-friction layer on a side of the seal surface, and a strengthening portion on a side opposite to the seal surface.

29. The air passage opening/closing device according to claim 1, wherein:

the film member has a film opening at a position between both ends of the film member in a reciprocating direction; and the film member opens the air passage through the film opening while both the ends of the film member are positioned at an outside of the air passage.

30. The air passage opening/closing device according to claim 1, wherein the one end of the film member, to be received into the receiving space, is a free end.

31. The air passage opening/closing device according to claim 1, wherein the part of the film member is received in the receiving space along the guide member and the side wall.

32. The air passage opening/closing device according to claim 1, further comprising:
 a heating unit, disposed in the air duct at a downstream air side of the film member, for heating air passing therethrough, wherein:
  the heat exchanger is disposed at an upstream air side of the film member;
  the heating unit is disposed to form a bypass passage through which air from the heat exchanger bypasses the heating unit; and
  the film member is disposed to open and close the heating unit and the bypass passage.

33. The air passage opening/closing device according to claim 1, wherein:
 when the part of the film member is entirely received in the receiving space, the film member fully opens the heating unit and fully closes the bypass passage.

34. The air passage opening/closing device according to claim 1, wherein the receiving space is a flat space defined by the air duct and the side wall of the heat exchanger.

* * * * *